(12) United States Patent
Ueda et al.

(10) Patent No.: US 7,688,393 B2
(45) Date of Patent: Mar. 30, 2010

(54) LIQUID CRYSTAL DISPLAY DEVICE WITH A BUFFER CAPACITOR ELECTRODE DISPOSED IN A NON-PIXEL ELECTRODE REGION

(75) Inventors: Kazuya Ueda, Kawasaki (JP); Tsuyoshi Kamada, Kawasaki (JP); Yohei Nakanishi, Tenri (JP); Hidefumi Yoshida, Machida (JP); Hideaki Tsuda, Atsugi (JP); Masakazu Shibasaki, Tenri (JP); Yasutoshi Tasaka, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 856 days.

(21) Appl. No.: 11/271,527

(22) Filed: Nov. 3, 2005
(Under 37 CFR 1.47)

(65) Prior Publication Data
US 2006/0215066 A1 Sep. 28, 2006

(30) Foreign Application Priority Data
Nov. 8, 2004 (JP) ............................. 2004-323626

(51) Int. Cl.
G02F 1/136 (2006.01)
G02F 1/1343 (2006.01)
(52) U.S. Cl. .......................................... 349/48; 349/38
(58) Field of Classification Search ............. 349/38–39, 349/129, 149–152, 48, 143, 144, 146
See application file for complete search history.

(56) References Cited
U.S. PATENT DOCUMENTS

| | | | |
|---|---|---|---|
| 4,840,460 A | 6/1989 | Bernot et al. ............... | 350/333 |
| 5,126,865 A | 6/1992 | Sarma ......................... | 359/59 |
| 5,818,407 A | 10/1998 | Hori et al. ..................... | 345/92 |
| 7,230,658 B2 * | 6/2007 | Chae ............................ | 349/48 |
| 2004/0196274 A1 | 10/2004 | Song et al. | |
| 2005/0036091 A1 * | 2/2005 | Song ........................... | 349/129 |
| 2006/0103800 A1 | 5/2006 | Li et al. | |

FOREIGN PATENT DOCUMENTS

| | | |
|---|---|---|
| JP | 02-000012 | 1/1990 |
| JP | 08-146464 | 6/1996 |
| JP | 3076938 | 6/2000 |
| JP | 2001-35766 | 8/2001 |
| JP | 2004-310113 | 11/2004 |

* cited by examiner

*Primary Examiner*—David Nelms
*Assistant Examiner*—Jessica M Merlin
(74) *Attorney, Agent, or Firm*—Greer, Burns & Crain, Ltd.

(57) ABSTRACT

The invention relates to a substrate for a liquid crystal display, a liquid crystal display having the substrate, and a method of driving the display and provides a substrate for a liquid crystal display which allow high display characteristics to be achieved, a liquid crystal display having the substrate, and a method of driving the display.

The substrate includes two TFTs having gate electrodes connected to a gate bus line and drain electrodes connected to a drain bus line, a pixel electrode connected to a source electrode, a pixel electrode connected to another source electrode and separated from the pixel electrode, another TFT having a gate electrode connected to another gate bus line and a source electrode connected to the pixel electrode, and a buffer capacitor portion having a buffer capacitor electrode connected to another drain electrode and another buffer capacitor electrode connected to a storage capacitor bus line.

15 Claims, 21 Drawing Sheets

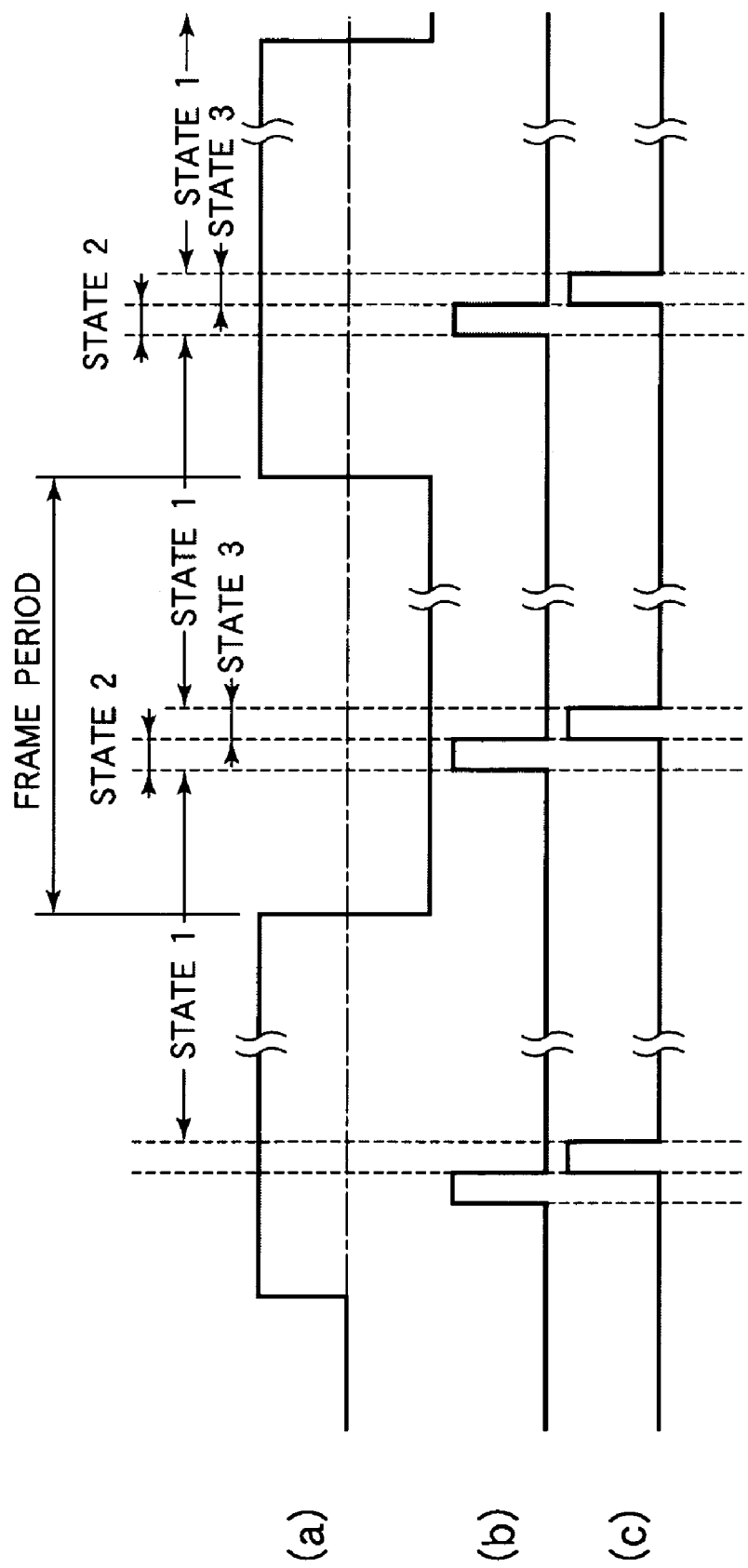

FRAME NUMBERS

LIQUID CRYSTAL DISPLAY DEVICE WITH A BUFFER CAPACITOR ELECTRODE DISPOSED IN A NON-PIXEL ELECTRODE REGION

BACKGROUND OF THE INVENTION

1. Field of the Invention

The present invention relates to a substrate for a liquid crystal display used in a display section of an electronic apparatus, a liquid crystal display having the substrate, and a method of driving the display.

2. Description of the Related Art

Recently, liquid crystal displays have been put in use as monitoring device of television receivers and personal computers. In such applications, high viewing angle characteristics must be achieved to allow a display screen to be viewed in all directions. FIG. 20 is a graph showing transmittance characteristics relative to applied voltages (T-V characteristics) of a VA (Vertically Aligned) mode liquid crystal display. The abscissa axis represents voltages (V) applied to a liquid crystal layer, and the ordinate axis represents light transmittance. The line A indicates T-V characteristics in a direction perpendicular to the display screen (hereinafter referred to as "a square direction"), and the line B indicates T-V characteristics in a direction at an azimuth angle of 90° and a polar angle of 60° with respect to the display screen (hereinafter referred to as "an oblique direction"). An azimuth angle is an angle measured counterclockwise with reference to the direction toward the right of the display screen. A polar angle is an angle to a line that is vertical to the center of the display screen.

As shown in FIG. 20, there is a distortion in transition of transmittance (luminance) in the vicinity of the region enclosed by the circle C. For example, while transmittance in the oblique direction is higher than transmittance in the square direction for a relatively low gradation at an applied voltage of about 2.5 V, the transmittance in the oblique direction is lower than the transmittance in the square direction for a relatively high gradient at an applied voltage of about 4.5 V. As a result, a luminance difference within an effective range of driving voltages becomes small when viewed in the oblique direction. This phenomenon appears in a most significant way as a color variation.

FIGS. 21A and 21B show how an image displayed on a display screen varies in its view. FIG. 21A shows the image as viewed in the direction square to the screen, and FIG. 21B shows the image as viewed in an oblique direction. As shown in FIGS. 21A and 21B, the color of the image appears more whitish when the display screen is viewed in the oblique direction than when viewed in the square direction.

FIGS. 22A to 22C show gradation histograms of three primary colors, i.e., red (R), green (G), and blue (B) in a reddish image. FIG. 22A shows the red gradation histogram. FIG. 22B shows the green gradation histogram. FIG. 22C shows the blue gradation histogram. The abscissa axes of FIGS. 22A to 22C represent gradations (256 gradations from 0 to 255), and the ordinate axes represent the rate of presence (%). As shown in FIGS. 22A to 22C, relatively high gradations of red and relatively low gradations of green and blue are present in high rates of presence. When such an image is displayed on a display screen of a VA mode liquid crystal display and is viewed in an oblique direction, the high gradations of red appear relatively darker, and the low gradations of green and blue appear relatively lighter. Since differences in luminance between the three primary colors thus become smaller, the image appears in a whitish color as a whole.

The above-described phenomenon similarly occurs in a liquid crystal display in the TN (Twisted Nematic) mode that is a driving mode according to the related art. Patent Documents 1 to 3 disclose techniques for mitigating the above-described problem in a TN mode liquid crystal display. FIG. 23 shows a basic configuration of one pixel of a liquid crystal display which is based on those known techniques. FIG. 24 shows a sectional configuration of the liquid crystal display taken along the line X-X in FIG. 23, and FIG. 25 shows an equivalent circuit of the one pixel of the liquid crystal display. As shown in FIGS. 23 to 25, the liquid crystal display has a thin film transistor (TFT) substrate 102, an opposite substrate 104, and a liquid crystal layer 106 sealed between the substrates 102 and 104.

The TFT substrate 102 has a plurality of gate bus lines 112 formed on a glass substrate 110 and a plurality of drain bus lines 114 formed across the gate bus lines 112 with an insulation film 130 interposed between them. TFTs 120 are disposed in the vicinity of intersections between the gate bus lines 112 and the drain bus lines 114, the TFT 120 being formed as a switching element at each pixel. A part of a gate bus line 112 serves as a gate electrode of a TFT 120, and a drain electrode 121 of a TFT 120 is electrically connected to a drain bus line 114. Storage capacitor bus lines 118 are formed so as to extend in parallel with the gate bus lines 112 across pixel regions which are defined by the gate bus lines 112 and the drain bus lines 114. A storage capacitor electrode 119 is formed at each pixel above the storage capacitor bus lines 118 with the insulation film 130 interposed between them. A storage capacitor bus line 119 is electrically connected to a source electrode 122 of a TFT 120 through a control electrode 125. A storage capacity Cs is formed between a storage capacitor bus line 118 and a storage capacitor electrode 119.

A pixel region defined by gate bus lines 112 and drain bus lines 114 is divided into a sub-pixel A and a sub-pixel B. A pixel electrode 116 is formed at the sub-pixel A, and a pixel electrode 117 is formed at the sub-pixel B separately from the pixel electrode 116. The pixel electrode 116 is electrically connected to the storage capacitor electrode 119 and the source electrode 122 of the TFT 120 through a contact hole 124. The pixel electrode 117 is electrically floating. The pixel electrode 117 has a region which overlaps the control electrode 125 with a protective film 132 interposed between them, and the electrode is indirectly connected to the source electrode 122 as a result of capacitive coupling through a control capacity Cc formed in that region.

An opposite substrate 104 has a color filter (CF) resin layer 140 formed on a glass substrate 111 and a common electrode 142 formed on the CF resin layer 140. A liquid crystal capacity Clc1 is formed between the pixel electrode 116 at the sub-pixel A and the common electrode 142, and a liquid crystal capacity Clc2 is formed between the pixel electrode 117 at the sub-pixel B and the common electrode 142. Alignment films 136 and 137 are formed at the interface between the TFT substrate 102 and the liquid crystal 106 and the interface between the opposite substrate 104 and the liquid crystal, respectively.

Let us now assume that the TFT 120 is turned on to apply a voltage to the pixel electrode 116 and that a voltage Vpx1 is applied to the liquid crystal layer at the sub-pixel A. Then, since the potential is divided according to the ratio between the liquid crystal capacity Clc2 and the control capacity Cc, a voltage different from that applied to the pixel electrode 116 is applied to the pixel electrode 117 at the sub-pixel B. A voltage Vpx2 applied to the liquid crystal layer at the sub-pixel B is given by:

$$Vpx2 = (Cc/(Clc2+Cc)) \times Vpx1$$

An actual voltage ratio Vpx2/Vpx1 (=(Cc/(Clc2+Cc)) is an item designed based on display characteristics of the liquid crystal display, and it is idealistically set in the range from 0.6 to 0.8.

When one pixel includes sub-pixels A and B having threshold voltages different from each other as thus described, a distortion of T-V characteristics as shown in FIG. 20 is distributed between the sub-pixels A and B. It is therefore possible to suppress the phenomenon of whitish appearance of an image when viewed in an oblique direction and to thereby improve viewing angle characteristics. The technique will be hereinafter referred to as a capacitive coupling HT (halftone grayscale) method.

While the above-described technique is disclosed in Patent Documents 1 to 3 on an assumption that the technique is used in a TN mode liquid crystal display, the technique is more advantageous when used in liquid crystal displays of the VA mode which has recently become the main stream in place of the TN mode.

FIGS. 26A to 26D are illustrations for explaining sticking that occurs in a liquid crystal display according to the related art employing the capacitive coupling HT method. FIG. 26A shows a black-and-white checker pattern displayed on a screen during a sticking test. Referring to the sticking test, a halftone of the same gradation is displayed throughout the screen immediately after continuously displaying the checker pattern shown in FIG. 26A for a certain time (e.g., 48 hours), and it is checked whether the checker pattern is visually perceived or not. When the checker pattern is visually perceived, the luminance of the screen is measured along the checker pattern to calculate a sticking rate. Let us assume that a represents the luminance of low-luminance regions of the checker pattern that is visually perceived and that the luminance of high-luminance regions is represented by a+b. Then, the sticking rate is defined as b/a.

FIG. 26B shows the display of the halftone on a screen of a liquid crystal display which does not employ the capacitive coupling HT method. FIG. 26C shows the display of the halftone on a screen of a liquid crystal display employing the capacitive coupling HT method. As shown in FIG. 26B, substantially none of the checker pattern was visually perceived when the halftone was displayed on the liquid crystal display which did not employ the capacitive coupling HT method. Luminance was measured along the line Y-Y' in FIG. 26B, and there was a luminance distribution as indicated by the line c in FIG. 26D. The sticking rate was only 0 to 5%. On the contrary, the checker pattern was visually perceived as shown in FIG. 26C on the liquid crystal display employing the capacitive coupling HT method. Luminance was measured along the line Y-Y' in FIG. 26C, and there was a luminance distribution as indicated by the line d in FIG. 26D. The sticking rate was 10% or more. As thus described, substantially no sticking occurred on the liquid crystal display which did not employ the capacitive coupling HT method, whereas the liquid crystal display employing the capacitive coupling HT method had a problem in that relatively dense sticking occurred.

As a result of evaluation and analysis on a characteristic distribution in a pixel of the liquid crystal display in which sticking occurred, it was revealed that the sticking occurred at the sub-pixel B having the pixel electrode 117 which was electrically floating. The pixel electrode 117 is connected to the control electrode 125 through a silicon nitride film (SiN film) having a very high electrical resistance and is connected to the common electrode 142 through the liquid crystal layer which also has a very high electrical resistance. Therefore, an electrical charge in the pixel electrode 117 is not easily discharged once it is charged. An electrical potential for each frame is written in the pixel electrode 116 at the sub-pixel A that is electrically connected to the source electrode 122 of the TFT 120, and the pixel electrode 116 is connected to the drain bus line 114 through an active semiconductor layer of the TFT 120 which is very much lower in electrical resistance than the SiN film and the liquid crystal layer. Therefore, the electrical charge charged in the pixel electrode 117 will never become undischargeable.

FIG. 27A is a graph showing changes in a capacity ratio, a voltage ratio, and a liquid crystal dielectric constant ∈ of the liquid crystal display according to the related art employing the capacitive coupling HT method. The abscissa axis of FIG. 27A represents voltages (V) applied to the liquid crystal layer at sub-pixel A, and the ordinate axis represents the capacity ratio, voltage ratio, and dielectric constant. The line e indicates a capacity ratio Cc/Clc2 between the control capacity Cc and the liquid crystal capacity Clc2. The line f indicates a voltage ratio Vpx2/Vpx1 between the voltage Vpx1 applied to the liquid crystal layer at the sub-pixel A and the voltage Vpx2 applied to the liquid crystal layer at the sub-pixel B. The line g indicates the dielectric constant ∈ of a negative liquid crystal that is used in the VA mode liquid crystal display. FIG. 27B shows changes in the voltage ratio Vpx2/Vpx1 with the ordinate axis (voltage ratio) drawn on an enlarged scale.

As shown in FIGS. 27A and 27B, in the liquid crystal display according to the related art employing the capacitive coupling HT method, the voltage ratio Vpx2/Vpx1 decreases as the applied voltage increases. In a liquid crystal display according to the related art employing the capacitive coupling HT method, about 50 to 80% of a pixel as a whole is occupied by the sub-pixel B which is lower in luminance than the sub-pixel A because a lower voltage is applied to the liquid crystal layer thereof. For this reason, a high transmittance can not be achieved at the sub-pixel B even when a voltage (5.5 to 7 V) for displaying white is applied to the pixel electrode 116. As a result, the luminance of the entire pixel is as low as about 40 to 80% of that of a liquid crystal display which does not employ the capacitive coupling HT method. A distortion of luminance transition occurs in the region of low gradations and medium gradations as shown in FIG. 20. It is therefore idealistic that a difference between threshold voltages of sub-pixels A and B is greater when the voltages are low and is smaller when the voltages are high. An idealistic liquid crystal display which is excellent in both of viewing angle characteristics and luminance can be provided, for example, by applying a voltage Vpx2 as lows as 1.5 to 2 V to the liquid crystal layer at the sub-pixels B when the voltage Vpx1 applied to the liquid crystal layer at the sub-pixel A is 2.5 V (that is, there is a great voltage difference (Vpx1−Vpx2)) and by applying a voltage Vpx2 as high as 5 to 5.5 V to the liquid crystal layer at the sub-pixels B when the voltage Vpx1 applied to the liquid crystal layer at the sub-pixels A is 5.5 V (that is, there is a small voltage difference (Vpx1−Vpx2)). However, in a liquid crystal display having a configuration in which the control capacity Cc and the liquid crystal capacity Clc2 are connected in series as shown in FIGS. 23 to 25, the voltage ratio Vpx2/Vpx1 is determined by the capacity ratio Cc/(Clc2+Cc). When the capacity ratio Cc/(Clc2+Cc) is constant, the voltage ratio Vpx2/Vpx1 is constant. Then, on the contrary to the above-described idealistic case, the voltage difference (Vpx1−Vpx2) will be greater, the higher the voltages are.

The above-described problem is made more significant by fluctuations of the liquid crystal capacity Clc2. As will be apparent from the line g shown in FIG. 27A, the dielectric constant $\in$ of the liquid crystal is greater, the higher the voltage applied thereto. Since the liquid crystal capacity Clc2 increases with the dielectric constant $\in$, the capacity ratio Cc/Clc2 becomes smaller, and the voltage ratio Vpx2/Vpx1 determined by Cc/(Clc2+Cc) also becomes small. As shown in FIG. 27B, the voltage ratio Vpx2/Vpx1 is 0.72 at low voltages of about 0 to 2 V, and the voltage ratio Vpx2/Vpx1 becomes as small as about 0.62 at a voltage of 5 V for displaying white. That is, the voltage difference (Vpx1−Vpx2) becomes greater at high voltages. Therefore, liquid crystal displays according to the related art employing the capacitive coupling HT method have a problem in that it is difficult to obtain high luminance.

The relationship between the liquid crystal capacity and the voltage ratio can result in more serious display irregularities when there is variation of the cell thickness. The transmittance of a liquid crystal display panel is determined by the retardation of the liquid crystal layer and, in general, the transmittance increases with the cell thickness and decreases with the cell thickness. In the case of a liquid crystal display according to the related art employing the capacitive coupling HT method, the liquid crystal capacity Clc2 decreases as the cell thickness increases, which results in an increase in the luminance of the pixel as a whole because the voltage ratio Vpx2/Vpx1 approaches 1. On the contrary, the liquid crystal capacity Clc2 increases as the cell thickness decreases, which results in a reduction in the luminance of the pixel as a whole because the voltage ratio Vpx2/Vpx1 approaches 0. That is, the liquid crystal display according to the related art employing the capacitive coupling HT method has a problem in that display irregularities are highly visible because fluctuation of the cell thickness results in a synergetic effect between variation of transmittance attributable to variation of the retardation and variation of transmittance attributable to variation of the voltage ratio.

Patent Document 1: JP-A-2-12
Patent Document 2: U.S. Pat. No. 4,840,460
Patent Document 3: Japanese Patent No. 3076938
Patent Document 4: JP-A-8-146464
Patent Document 5: JP-A-2001-235766

SUMMARY OF THE INVENTION

It is an object of the invention to provide a substrate for a liquid crystal display which allow preferable display characteristics to be achieved, a liquid crystal display utilizing the substrate, and a method of driving the display.

The above-described object is achieved by a substrate for a liquid crystal display, characterized in that it comprises:
a plurality of gate bus lines formed in parallel with each other on a substrate;
a plurality of drain bus lines formed across the plurality of gate bus lines with an insulation film interposed between them;
a plurality of storage capacitor bus lines formed in parallel with the gate bus lines;
first and second transistors each having a gate electrode electrically connected to an n-th gate bus line and a drain electrode electrically connected to the drain bus line;
a first pixel electrode electrically connected to a source electrode of the first transistor;

a second pixel electrode electrically connected to a source electrode of the second, transistor and separated from the first pixel electrode;
a pixel region including a first sub-pixel at which the first pixel electrode is formed and a second sub-pixel at which the second pixel electrode is formed;
a third transistor having a gate electrode electrically connected to an (n+1)-th gate bus line and a source electrode electrically connected to the second pixel electrode; and
a buffer capacitor portion including a first buffer electrode electrically connected to a drain electrode of the third transistor and a second buffer capacitor electrode which is disposed opposite to the first buffer capacitor electrode with an insulation film interposed therebetween and which is electrically connected to the storage capacitor bus line.

The invention makes it possible to provide a liquid crystal display which can achieve high display characteristics.

BRIEF DESCRIPTION OF THE DRAWINGS

FIG. 5 shows driving waveforms of the liquid crystal display according to the first embodiment of the invention;

DESCRIPTION OF THE PREFERRED EMBODIMENTS

First Embodiment

Figure 1:
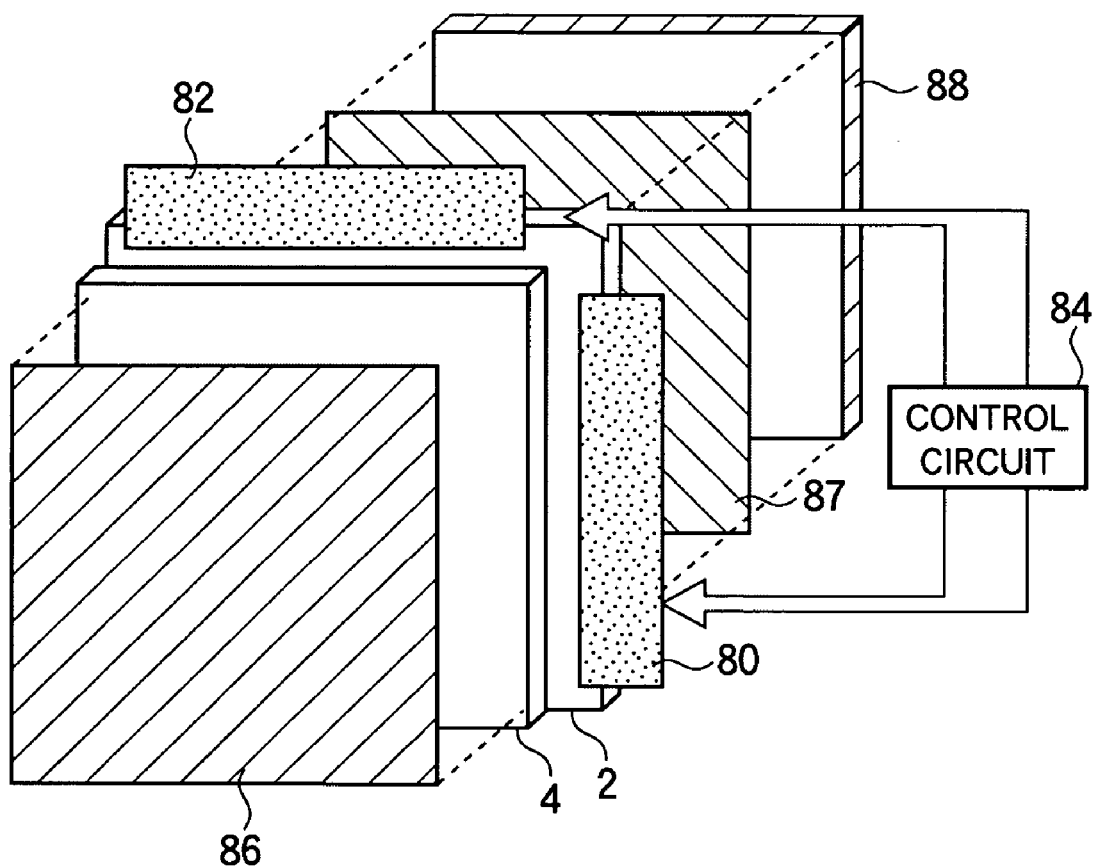
FIG. 1 shows a schematic configuration of a liquid crystal display according to a first embodiment of the present embodiment.

A description will now be made with reference to FIGS. 1 to 13 on a substrate for a liquid crystal display, a liquid crystal display having the substrate, and a method of driving the display according to a first embodiment of the invention. FIG. 1 shows a schematic configuration of the liquid crystal display of the present embodiment. As shown in FIG. 1, the liquid crystal display includes a TFT substrate 2 having gate bus lines and drain bus lines formed across each other with an insulation film interposed between them and a TFT and a pixel electrode formed at each pixel. The liquid crystal display also includes an opposite substrate 4 having color filters and a common electrode formed thereon and a liquid crystal 6 (not shown in FIG. 1) having, for example, negative dielectric constant anisotropy sealed between the substrates 2 and 4.

A gate bus line driving circuit 80 loaded with a driver IC for driving the plurality of gate bus lines and a drain bus line driving circuit 82 loaded with a driver IC for driving the plurality of drain bus lines are connected to the TFT substrate 2. The driving circuits 80 and 82 output a scan signal and a data signal to a predetermined gate bus line and drain bus line based on predetermined signals output by a control circuit 84. A polarizer 87 is disposed on the surface of the TFT substrate 2 opposite to the surface on which the TFT elements are formed, and a polarizer 86 is disposed on the surface of the opposite substrate 4 opposite to the surface on which the common electrode is formed, the polarizer 86 being in a crossed Nicols relationship with the polarizer 87. A backlight unit 88 is disposed on the surface of the polarizer 87 opposite to the surface thereof facing the TFT substrate 2.

Figure 2:
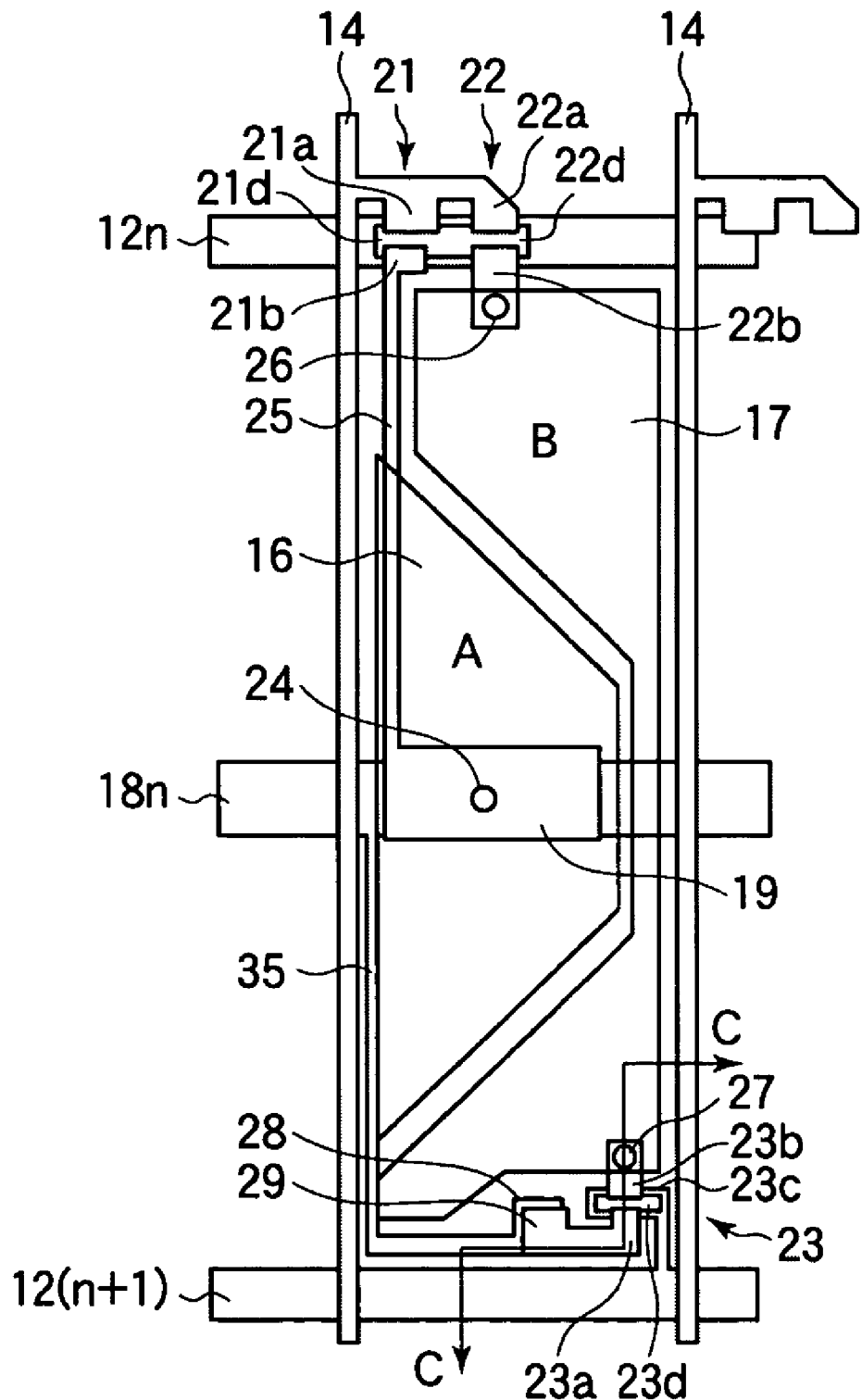
FIG. 2 shows a configuration of a substrate for a liquid crystal display according to the first embodiment of the invention.
Figure 3:
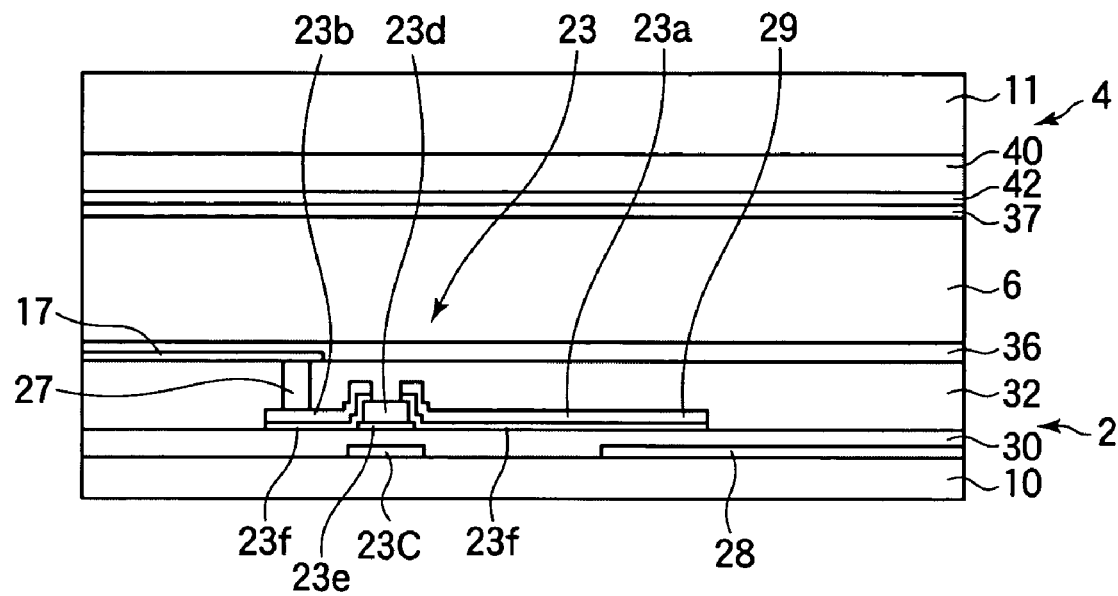
FIG. 3 is a sectional view showing the configuration of the liquid crystal display according to the first embodiment of the invention;.
Figure 4:
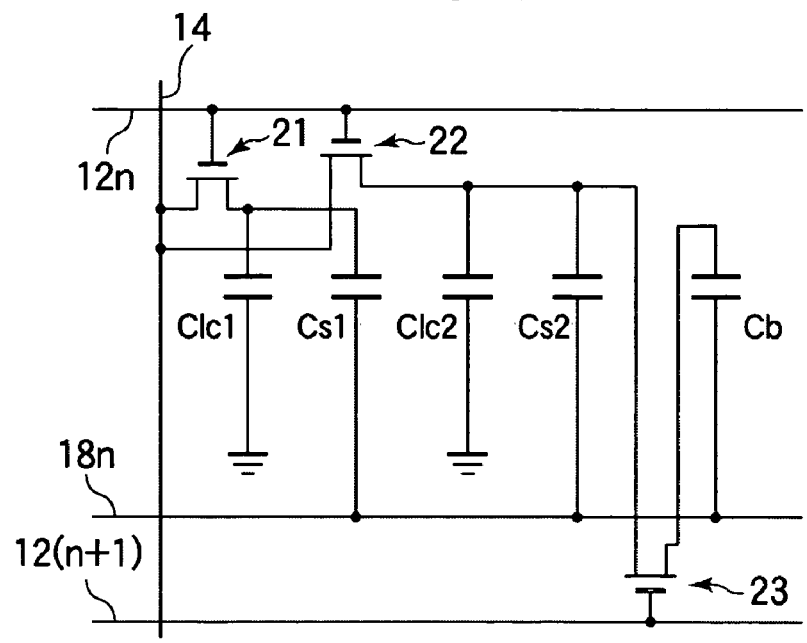
FIG. 4 shows an equivalent circuit of one pixel of the liquid crystal display according to the first embodiment of the invention.

FIG. 2 shows a configuration of one pixel of the TFT substrate 2 as a substrate for a liquid crystal display according to the present embodiment. FIG. 3 shows a sectional configuration of the liquid crystal display taken in a position corresponding to the line C-C in FIG. 2. FIG. 4 shows an equivalent circuit of the one pixel of the liquid crystal display of the present embodiment. As shown in FIGS. 2 to 4, the TFT substrate 2 includes a plurality of gate bus lines 12 formed on a glass substrate 10 and a plurality of drain bus lines 14 formed across the gate bus lines 12, an insulation film 30 constituted by a SiN film being interposed between the bus lines. The plurality of gate bus lines 12 are scanned, for example, on a line sequential basis, and FIGS. 2 and 4 show an n-th gate bus line 12n which is the n-th line scanned and an (n+1)-th gate bus line 12(n+1) which is the (n+1)-th line scanned. A first TFT 21 and a second TFT 22 are disposed adjacent to each other at each pixel in the vicinity of an intersection between a gate bus line 12 and a drain bus line 14. A part of the gate bus line 12 serves as gate electrodes of the TFTs 21 and 22. Active semiconductor layers (not shown) of the TFTs 21 and 22 are formed, for example, integrally with each other, above the gate bus line 12 with an insulation film 30 interposed between them. Channel protection films 21d and 22d are formed, for example, integrally with each other, on the active semiconductor layers. Above the channel protection film 21d of the TFT 21, a drain electrode 21a accompanied by an n-type impurity semiconductor layer (not shown) underlying the same and a source electrode 21b accompanied by an n-type impurity semiconductor layer (not shown) underlying the same are formed in a face-to-face relationship with a predetermined gap left between them. Above the channel protection film 22d of the TFT 22, a drain electrode 22a accompanied by an n-type impurity semiconductor layer (not shown) underlying the same and a source electrode 22b accompanied by an n-type impurity semiconductor layer (not shown) underlying the same are formed in a face-to-face relationship with a predetermined gap left between them. Each of the drain electrode 21a of the TFT 21 and the drain electrode 22a of the TFT 22 is electrically connected to the drain bus line 14. The TFTs 21 and 22 are disposed in parallel with each other.

Storage capacitor bus lines 18 extending in parallel with the gate bus lines 12 are formed across pixel regions defined by the gate bus lines 12 and the drain bus lines 14. FIGS. 2 and 4 show a storage capacitor bus line 18n which is disposed between the gate bus line 12n and the gate bus line 12(n+1). A storage capacitor electrode 19 is formed above the storage capacitor bus line 18n with the insulation film 30 interposed between them, a storage capacitor electrode 19 being provided at each pixel. The storage capacitor electrode 19 is electrically connected to the source electrode 21b of the TFT 21 through a connection electrode 25. A first storage capacity Cs1 is formed between the storage capacitor bus line 18n and the storage capacitor electrode 19 facing each other with the insulation film 30 interposed between them.

The pixel regions defined by the gate bus lines 12 and the drain bus lines 14 are divided into a sub-pixel A and a sub-pixel B. In FIG. 2, the sub-pixel A, which has, for example, a trapezoidal shape, is disposed on the left side of a middle part of the pixel region, and the sub-pixel B is disposed to occupy an upper part, a lower part, and the right end of the middle part of the pixel region except the region occupied by the sub-pixel A. For example, the sub-pixels A and B are disposed in the pixel region in a substantially line symmetrical relationship about the storage capacitor bus line 18n. A pixel electrode 16 is formed at the sub-pixel A, and a pixel electrode 17 is formed at the sub-pixel B separately from the pixel electrode 16. Both of the pixel electrodes 16 and 17 are constituted by transparent conductive films such as ITO. In order to achieve high viewing angle characteristics, it is desirable that the areal ratio of the sub-pixel B to the sub-pixel A is in the range from ½ to 4, inclusive. The pixel electrode 16 is electrically connected to the storage capacitor electrode 19 and the source electrode 21b of the TFT 21 through a contact hole 24 which is an opening in a protective film 32. The pixel electrode 17 is electrically connected to the source electrode 22b of the TFT 22 through a contact hole 26 which is an opening in the protective film 32. The pixel electrode 17 includes a region which overlaps the storage capacitor bus line 18n with the protective film 32 and the insulation film 30 interposed. A second storage capacity Cs2 is formed in that region between the pixel electrode 17 and the storage capacitor bus line 18n facing each other with the protective film 32 and the insulation film 30 interposed between them.

A third TFT 23 is disposed in the lower part of the pixel region in FIG. 2. A gate electrode 23c of the TFT 23 is electrically connected to the gate bus line 12(n+1) next to that pixel. An active semiconductor layer 23e is formed above the gate electrode 23c with the insulation film 30 interposed between them. A channel protection film 23d is formed on the active semiconductor layer 23e. Above the channel protection film 23d, a drain electrode 23a accompanied by an n-type impurity semiconductor layer 23f underlying the same and a source electrode 23b accompanied by an n-type impurity semiconductor layer 23f underlying the same are formed in a face-to-face relationship with a predetermined gap left between them. The source electrode 23b is electrically connected to the pixel electrode 17 through a contact hole 27. In the vicinity of the TFT 23, a buffer capacitor electrode 28 is disposed in electrical connection with the storage capacitor bus line 18n through a connection electrode 35. A buffer capacitor electrode 29 is disposed above the buffer capacitor electrode 28 with the insulation film 30 interposed between them. The buffer capacitor electrode 29 is electrically connected to the drain electrode 23a. A buffer capacity Cb is formed between the buffer capacitor electrodes 28 and 29 facing each other with the insulation film 30 interposed between them.

The opposite substrate 4 has a CF resin layer 40 formed on a glass substrate 11 and a common electrode 42 formed on the CF resin layer 40. A liquid crystal capacity Clc1 is formed between the pixel electrode 16 of the sub-pixel A and the common electrode 42 which face each other with a liquid crystal 6 interposed between them, and a liquid crystal capacity Clc2 is formed between the pixel electrode 17 of the sub-pixel B and the common electrode 42. An alignment film (vertical alignment film) 36 is formed at the interface between the TFT substrate 2 and the liquid crystal 6, and an alignment film 37 is formed at the interface between the opposite substrate 4 and the liquid crystal 6. Thus, the liquid crystal 6 in a state in which no voltage is applied is aligned substantially perpendicularly to the surfaces of the substrates.

The factor for the occurrence of relatively dense sticking in a liquid crystal display according to the related art employing the capacitive coupling HT method is the fact that a pixel electrode of a sub-pixel B is connected to each of a control electrode and a common electrode with a very high electrical resistance which disallows an electrical charge accumulated in the pixel electrode to be discharged easily. On the contrary, in the present embodiment, the pixel electrode 17 at the sub-pixel B is connected to the drain bus line 14 through the TFT 22. The electrical resistance of the active semiconductor layer of the TFT 22 is very much lower than the electrical resistance of the insulation film 30 and the protective film 32 even in an off-state. Therefore, an electrical charge accumulated in the pixel electrode 17 can be easily discharged. In the present embodiment, therefore, no dense sticking will occur even through the halftone method is employed.

Figure 6A:
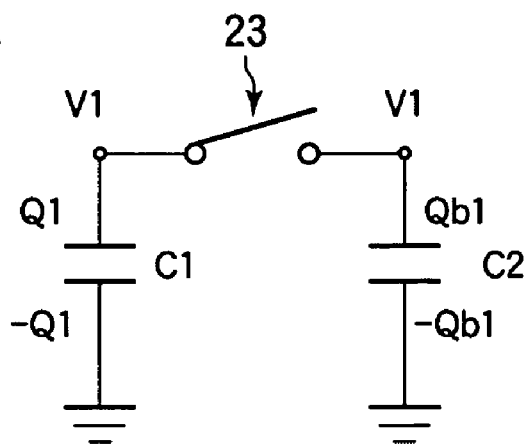
FIGS. 6A to 6C show operations of a TFT 23 and changes in the voltage at the same in the liquid crystal display according to the first embodiment of the invention.

Operations of the liquid crystal display of the present embodiment will now be described. In FIG. 5, (a) to (C) show driving waveforms of the liquid crystal display of the present embodiment. In FIG. 5, (a) shows a waveform of a data voltage applied to the drain bus line 14 connected to the drain electrodes 21a and 22a of the TFTs 21 and 22 of a certain pixel. In FIG. 5, (b) shows a waveform of a gate voltage applied to the n-th gate bus line 12n connected to the gate electrodes of the TFTs 21 and 22 of the pixel. In FIG. 5, (c) shows a waveform of a gate voltage applied to the (n+1)-th gate bus line 12(n+1) connected to the gate electrode 23c of the TFT 23 of the pixel. Time is plotted in the horizontal direction in (a) to (c) of FIG. 5, and voltage levels are plotted in the vertical direction. FIGS. 6A and 6C show operations of the TFT 23 of the pixel and changes in the voltage at the same. The sum of the liquid crystal capacity Clc2 of the sub-pixel B and the storage capacity Cs2 will be referred to as a capacity C1, and the buffer capacity Cb will be referred to as a capacity C2.

FIG. 6A represents the state 1 shown in FIG. 5. As shown in FIG. 6A, in the state 1 in which both of the gate bus lines 12n and 12(n+1) are unselected, the capacities C1 and C2 are at the same voltage V1 (e.g., 0 v). At this time, an electrical charge Q1 accumulated in the capacity C1 equals C1×V1, and an electrical charge Qb1 accumulated in the capacity C2 equals C2×V1. The TFT 23 is in the off-state because the gate bus line 12(n+1) is unselected.

Figure 6B:
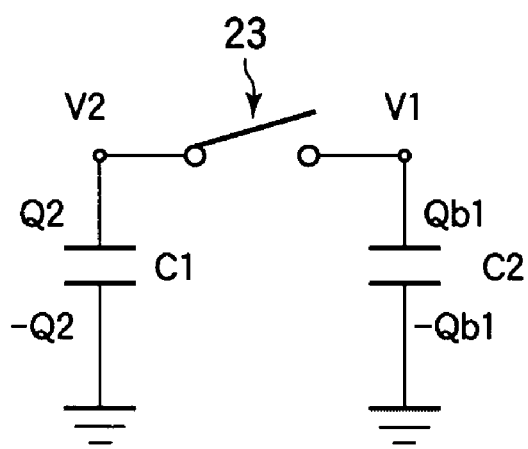
Figure 6C:
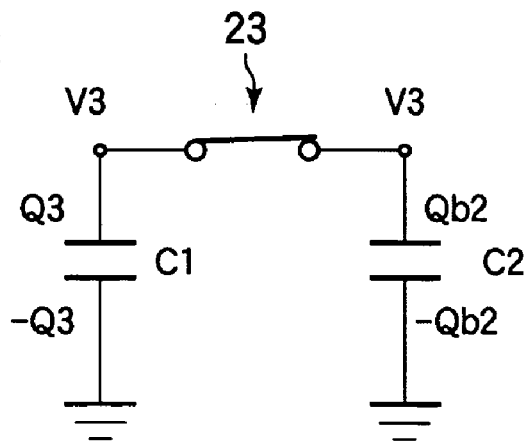

FIG. 6B represents the state 2 shown in FIG. 5. As shown in FIG. 6B, in the state 2 in which the gate bus line 12n is selected, the TFTs 21 and 22 are in an on-state. As a result, the capacity C1 has a voltage V2 (e.g., V2≠V1). At this time, an electrical charge Q2 accumulated in the capacity C1 equals C1×V2. Since the TFT 23 is in the off-state, the voltage V1 at the capacity C2 remains as it is, and the electrical charge Qb1 is kept accumulated in the capacity C2. Although not shown, the liquid crystal capacity Clc1 and the storage capacity Cs1 at the sub-pixel A also have the voltage V2 similarly to the capacity C1.

FIG. 6C represents the state 3 shown in FIG. 5. As shown in FIG. 6C, in the state 3 in which the gate bus line 12n is unselected and the next gate bus line 12(n+1) is selected, the TFTs 21 and 22 are in the off-state, and the TFT 23 is in the on-state. When the TFT 23 is in the on-state, electrical charges are redistributed such that the voltage at the capacity C1 equals the voltage at the capacity C2. The sum Q3+Qb2 of the electrical charges accumulated in the capacities C1 and C2 in the state 3 equals the sum Q2+Qb1 of the electrical charges which have been accumulated in the capacities C1 and C2 in the state 2 (Q3+Qb2=Q2+Qb1). When normal driving is employed in which the polarity of the applied voltage is inverted for each frame, the polarity of a new electrical charge that flows into the capacity C2 is the reverse of the polarity of the electrical charge Q2 which has been accumulated. Therefore, the total amount of electrical charge decreases to result in a reduction of the voltage. Thus, the capacities C1 and C2 have a voltage V3 expressed as follows.

$$V3=Q3/C1=Qb2/C2$$

Let us assume that C2/C1=α. Then, we obtain:

$$V3=1/(1+\alpha)\times V2+\alpha/(1+\alpha)\times V1$$

Since such a phenomenon does not occur in the sub-pixel A, the voltage V2 at the liquid crystal capacity Clc1 of the sub-pixel A remains as it is. As a result, there will be a difference between the voltage V2 at the liquid crystal capacity Clc1 of the sub-pixel A and the voltage V3 at the liquid crystal capacity Clc2 of the sub-pixel B. After the voltages of both of the capacities C1 and C2 become the voltage V3 in the state 3, the TFT 23 turns off and enters the same state as the state 1. Thereafter, the states 1, 2, 3, and 1 repeat in the order listed in each frame period.

Figure 7:
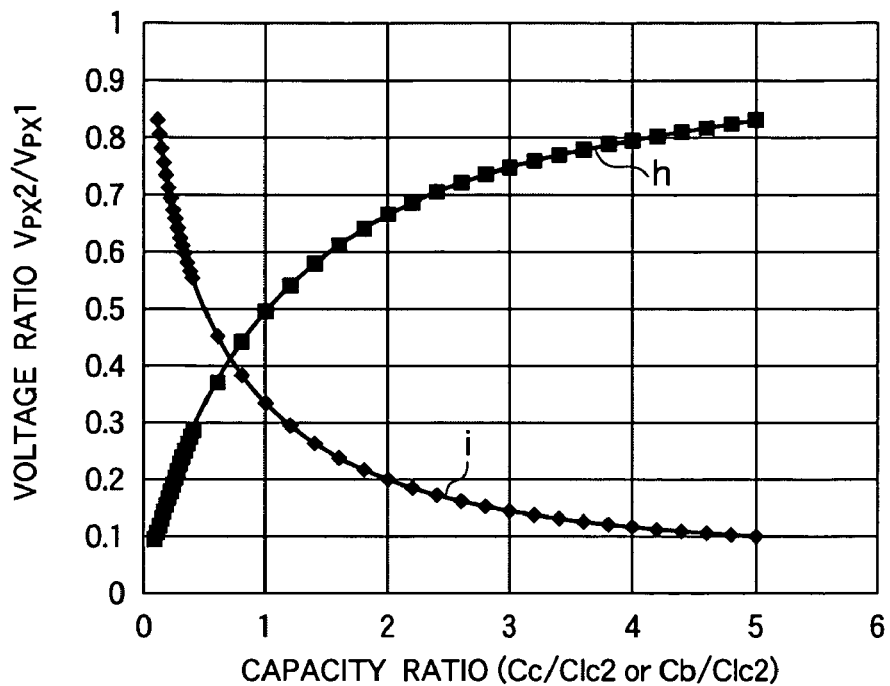
FIG. 7 is a graph showing changes in a voltage ratio relative to a capacity ratio in the liquid crystal display according to the first embodiment of the invention and a liquid crystal display according to the related art.

The most significant feature of the liquid crystal display of the present embodiment in comparison to liquid crystal displays according to the related art employing the capacitive coupling HT method is the fact that the capacity for decreasing the voltage at the sub-pixel B below the voltage at the sub-pixel A is connected in parallel with the liquid crystal capacity Clc2 instead of being series connected. As a result, fluctuation of the voltage ratio in response to fluctuation of the liquid crystal capacity Clc2 has a tendency that is completely the reverse of the tendency in the related art. FIG. 7 is a graph showing changes in the voltage ratio relative to the capacity ratio in the liquid crystal display of the present embodiment and a liquid crystal display according to the related art. The abscissa axis represents the capacity ratio Cc/Clc2 between the control capacity Cc and the liquid crystal capacity Clc2 of the liquid crystal display according to the related art employing the capacitive coupling HT method and the capacity ratio Cb/Clc2 between the buffer capacity Cb and the liquid crystal capacity Clc2 of the liquid crystal display of the present embodiment. The ordinate axis represents the voltage ratio Vpx2/Vpx1 between the voltage Vpx1 applied to the liquid crystal layer at the sub-pixel A and the voltage Vpx2 applied to the liquid crystal layer at the sub-pixel B. The line h indicates changes in the voltage ratio in the liquid crystal display according to the related art, and the line i indicates changes in the voltage ratio in the liquid crystal display of the present embodiment. As already described, the liquid crystal capacity Clc2 decreases as the applied voltage decreases and increases as the applied voltage increases. Therefore, the right side of the graph showing high capacity ratios Cc/Clc2 or Cb/Clc2 represents a state in which low voltages are applied, and the left side of the graph showing low capacity ratios Cc/Clc2 or Cb/Clc2 represents a state in which high voltages are applied.

As shown in FIG. 7, in the liquid crystal display according to the related art employing the capacitive coupling HT method, the voltage ratio Vpx2/Vpx1 approaches 0 as the voltages applied to the liquid crystal layers increase, which results in a voltage difference (Vpx1−Vpx2) that is greater than required. It has been therefore difficult to obtain a liquid crystal display having high luminance according to the related art. On the contrary, in the liquid crystal display of the present embodiment, since the voltage ratio Vpx2/Vpx1 approaches 1 as the voltages applied to the liquid crystal layers increase, the voltage difference (Vpx1−Vpx2) is relatively small when high voltages are applied.

Figure 8:
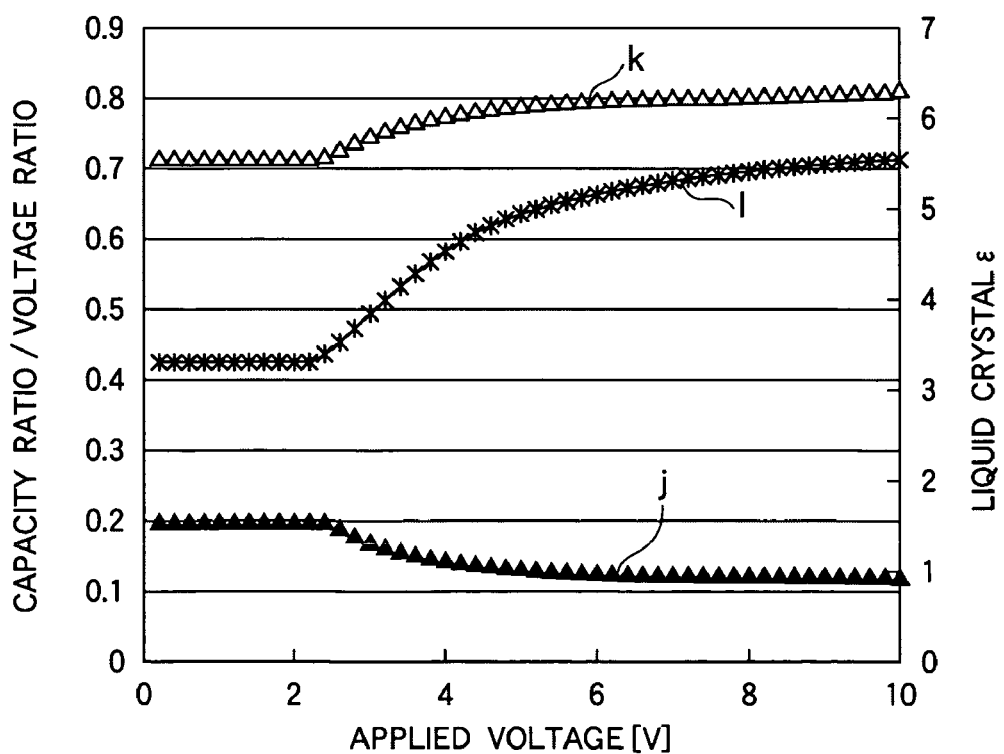
FIG. 8 is a graph showing changes in the capacity ratio, the voltage ratio, and a dielectric constant $\in$ of the liquid crystal in the liquid crystal display according to the first embodiment of the invention.

FIG. 8 is a graph showing changes in the capacity ratio, the voltage ratio, and the dielectric constant ∈ of the liquid crystal in the liquid crystal display of the present embodiment. The abscissa axis of FIG. 8 represents the voltage (V) applied to the liquid crystal layer at the sub-pixel A, and the ordinate axis represents the capacity ratio, the voltage ratio, and the dielectric constant. The line j indicates the capacity ratio Cb/Clc2; the line k indicates the voltage ratio Vpx2/Vpx1; and the line 1 indicates the dielectric constant ∈ of the liquid crystal that is a negative type. As indicated by the line k in FIG. 8, the voltage ratio Vpx2/Vpx1 increases as the applied voltage increases. The voltage ratio Vpx2/Vpx1 is 0.72 when the applied voltage is about 2 V or less, whereas the voltage ratio Vpx2/Vpx1 is 0.78 when the applied voltage is about 5 V. Therefore, when a voltage for displaying white is applied to the liquid crystal layer at the sub-pixel A, a relatively high voltage is applied to the liquid crystal layer at the sub-pixel B. Since a relatively high transmittance can therefore be obtained at the sub-pixel B, the luminance of the pixel as a whole is significantly improved. Thus, the present embodiment makes it possible to provide a liquid crystal display having high luminance.

Figure 9:
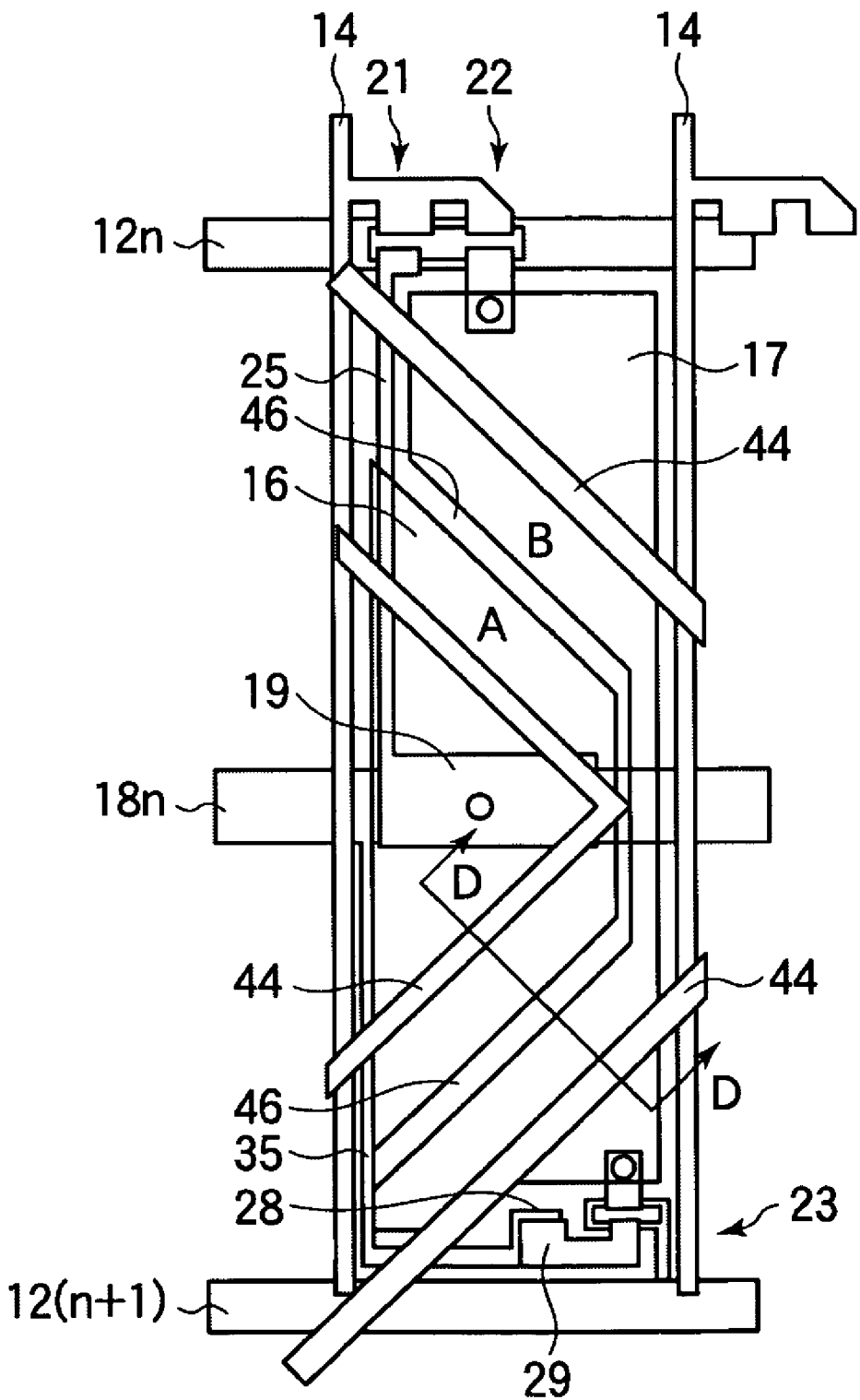
FIG. 9 shows a configuration of an MVA type liquid crystal display according to the first embodiment of the invention.
Figure 10:
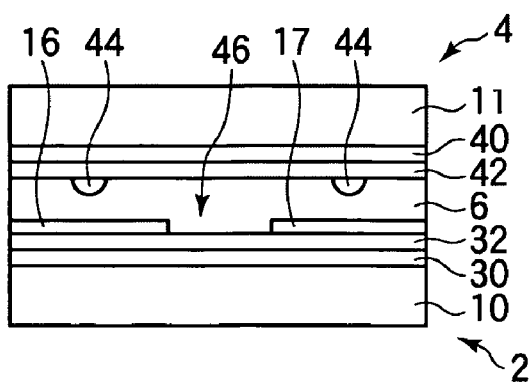
FIG. 10 is a sectional view showing the configuration of the MVA type liquid crystal display according to the first embodiment of the invention.

FIG. 9 shows a configuration of a pixel of an MVA (Multi-domain Vertical Alignment) type liquid crystal display employing the present embodiment. FIG. 10 shows a sectional configuration of the liquid crystal display taken along the line D-D in FIG. 9. As shown in FIGS. 9 and 10, linear protrusions 44 extending obliquely to edges of a pixel region are formed on an opposite substrate 4 using such as a photosensitive resin. The linear protrusions 44 serve as alignment regulating structures for regulating the alignment of a liquid crystal 6. Alternatively, slits may be provided on a common electrode (opposite electrode) 42 instead of the linear protrusions 44 as alignment regulating structures. A linear slit 46 that separates a pixel electrode 16 and a pixel electrode 17 from each other extends in parallel with the linear protrusions 44 obliquely to the edges of the pixel region. The slit 46 also serves as an alignment regulating structure on the side of a TFT substrate 2.

It is known that a liquid crystal display employing the capacitive coupling HT method has high viewing angle characteristics when the voltage ratio Vpx2/Vpx1 is in the range from about 0.9 to about 0.5. As shown in FIG. 7, the range of the capacity ratio Cb/Clc2 (the capacity ratio Cb/(Clc2+Cs2) in a configuration including the storage capacity Cs2) that allows a voltage ratio Vpx2/Vpx1 within such a range is substantially from 0.05 to 0.6, inclusive. In the present example, a capacity ratio Cb/Clc2 of 0.2 has been chosen to set the voltage ratio Vpx2/Vpx1 at substantially 0.72 as an optimum condition.

Figure 11:
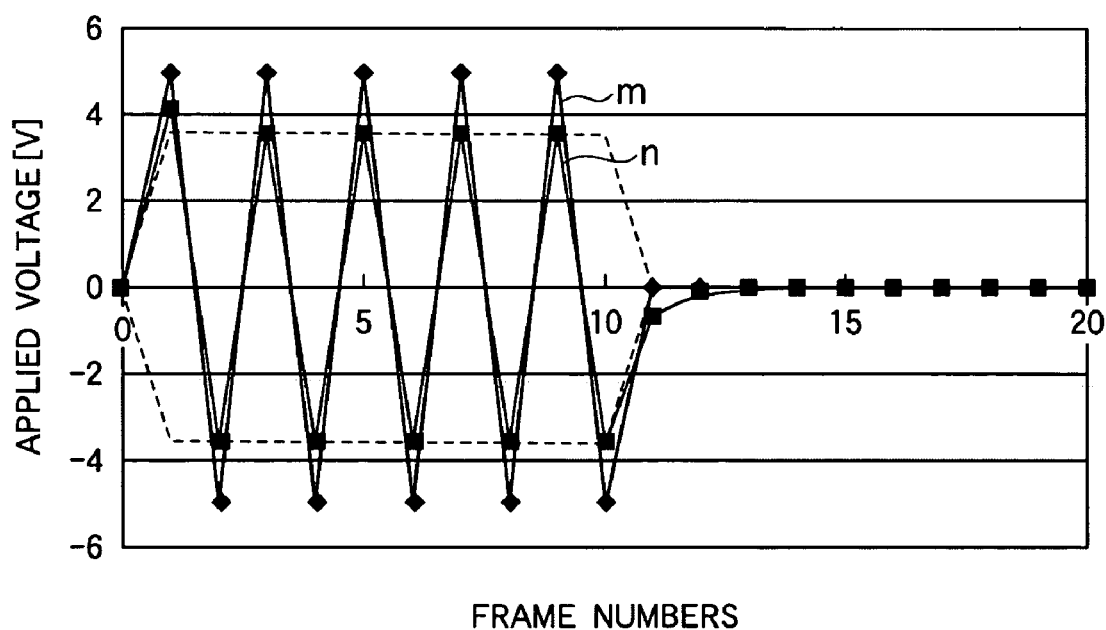
FIG. 11 is a graph showing changes in a voltage at each of pixel electrodes of sub-pixels A and B of the MVA type liquid crystal display according to the first embodiment of the invention.

FIG. 11 is a graph showing changes in voltages at the pixel electrodes 16 and 17 of the pixel shown in FIG. 9 observed when a voltage of 0 V is applied to the pixel electrode 16 in a 0-th frame to display black; voltages of ±5 V are applied to the pixel electrode 16 in first to tenth frames to display white; and a voltage of 0 V is applied to the pixel electrode 16 in eleventh to twentieth frames to display black. The abscissa axis of the graph represents the frame numbers, and the ordinate axis represents the applied voltages (V). The line m indicates the voltage Vpx1 that is applied to the pixel electrode 16, and the line n indicates the voltage Vpx2 that is applied to the pixel electrode 17. The broken lines in the graph are plotted by connecting points representing values that are 0.72 times the voltage Vpx1 on the sides of the positive and negative polarities, respectively. As shown in FIG. 11, the voltage Vpx2 applied to the pixel electrode 17 at the sub-pixel B of the liquid crystal display of the present embodiment has characteristics as descried below.

In the second to tenth frames and the eleventh to twentieth frames, the voltage Vpx2 is stable at the value that is substantially 0.72 times the voltage Vpx1. In the first and the eleventh frames at which the voltage Vpx1 greatly fluctuates from the values in the preceding frames, the magnitude of the voltage Vpx2 is greater than 0.72 times the voltage Vpx1. The reason is that the amount of electric charge accumulated in the buffer capacity Cb in a frame is determined by the gradation of the preceding frame. When driving is performed by inverting the polarity of the voltage at each frame, in the second to tenth frames, the voltage Vpx2 is decreased because an electrical charge of the reverse polarity is accumulated in the buffer capacity Cb. On the contrary, in the first frame that is preceded by a frame displaying black, the electrical charge accumulated in the buffer capacity Cb is substantially 0, which results in an overshoot, i.e., a somewhat greater magnitude of the voltage Vpx2. In the eleventh frame that is preceded by a frame displaying white, the amount of the electrical charge of the reverse polarity accumulated in the buffer capacity Cb is great, which results in an overshoot, i.e., a somewhat greater magnitude of the voltage Vpx2.

Figure 12:
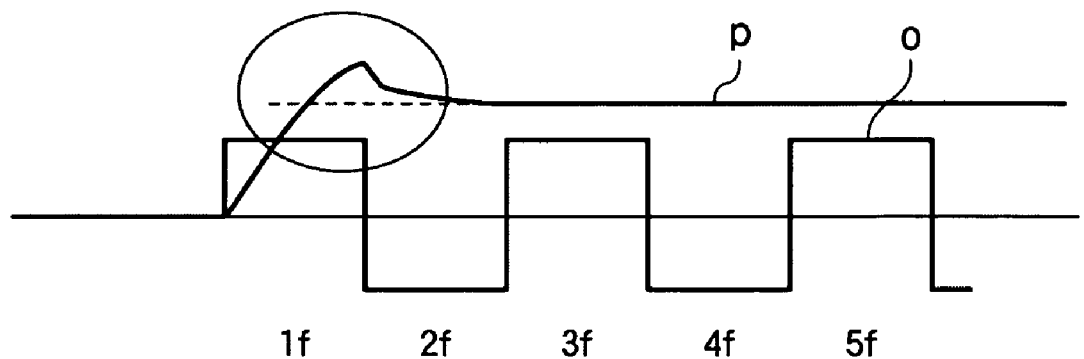
FIG. 12 is a graph showing changes in a voltage Vpx1 and luminance that occur as time passes.

FIG. 12 is a graph showing changes, which occur as time passes, in the voltage Vpx1 applied to the pixel electrode 16 of the pixel of interest in the first to fifth frames, the graph also showing luminance. Time is plotted in the horizontal direction, and voltage levels and luminance levels are plotted in the vertical direction. The line o indicates the voltage Vpx1, and the line p indicates luminance. As shown in FIG. 12, when the response of the liquid crystal is sufficiently quick, luminance in only the first frame (1f) encircled in the figure is higher than desired luminance if there is an overshoot. Specifically, there is a possibility of the phenomenon of over-highlighting of edges when a dynamic image is displayed.

Figure 13:
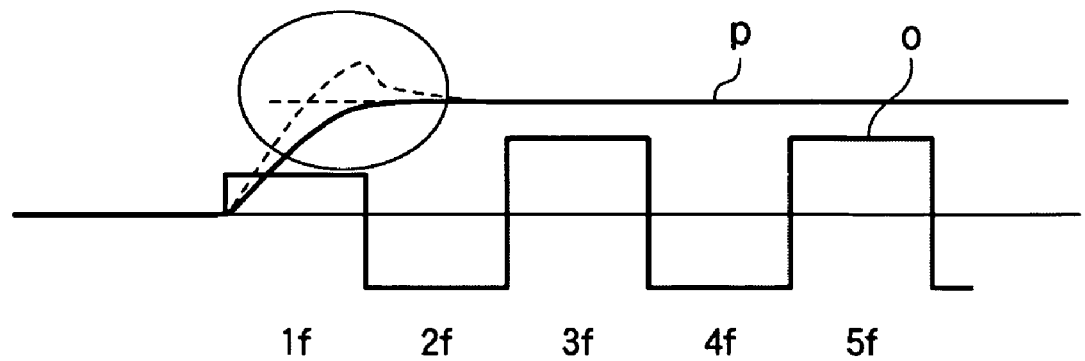
FIG. 13 is a graph showing changes in the voltage Vpx1 and luminance that occur as time passes.

FIG. 13 is a graph showing changes in the voltage Vpx1 and luminance which occur as time passes when the method of driving a liquid crystal display according to the present embodiment is used. For example, a control unit of a liquid crystal display compares input gradation data of two frames (input gradation data Gm of an m-th frame and input gradation data G(m+1) of an (m+1)-th frame) stored in a frame memory for each pixel. When Gm <G(m+1), as shown in FIG. 13, output gradation data G'(m+1) of the (m+1)-th frame is corrected such that it stays in a range expressed by Gm<G'(m+1)<G(m+1) to perform under-drive type driving in which a somewhat lower voltage is applied to the liquid crystal layer in the (m+1)-th frame. Although not shown, when Gm>Gm(m+1), the output gradation data G'(m+1) of the (m+1)-th frame is corrected such that it stays in a range expressed by Gm>G'(m+1)>G(m+1) to perform over-drive type driving in which a somewhat higher voltage is applied to the liquid crystal layer in the (m+1)-th frame.

An overshoot as described above is a new phenomenon which has occurred in the liquid crystal display of the present embodiment, and it does not occur in a liquid crystal display according to the related art employing the capacitive coupling HT method. Therefore, the method of driving a liquid crystal display according to the present invention for eliminating an overshoot is a novel technique which has been disclosed for the first time by the present embodiment.

In general, it has been difficult to put liquid crystal displays according to the related art employing the capacitive coupling HT method in practical use because of the occurrence of sticking, although they have quite high viewing angle characteristics. The present embodiment is different in configuration from the related art in that neither the pixel electrode 16 at the sub-pixel A having a lower threshold voltage nor the pixel electrode 17 at the subs-pixel B having a higher threshold voltage is in a floating state and in that the pixel electrodes 16 and 17 are connected to the drain bus line 14 through the TFTs 21 and 22, respectively. As a result, a liquid crystal display having good display characteristics and no image sticking can be provided. In the present embodiment, the buffer capacity Cb for decreasing the voltage applied to the liquid crystal layer at the sub-pixel B is connected in parallel with the liquid crystal capacity Clc2 and the storage capacity Cs2. Since the voltage ratio Vpx2/Vpx1 thus becomes closer to 1 as the voltage applied to the liquid crystal layer increases, the voltage difference (Vpx1–Vpx2) becomes relatively small when a high voltage is applied. It is therefore possible to provide a liquid crystal display which has high viewing angle characteristics and luminance and in which display irregularities attributable to fluctuation of the cell thickness are less likely to occur.

Second Embodiment

Figure 14:
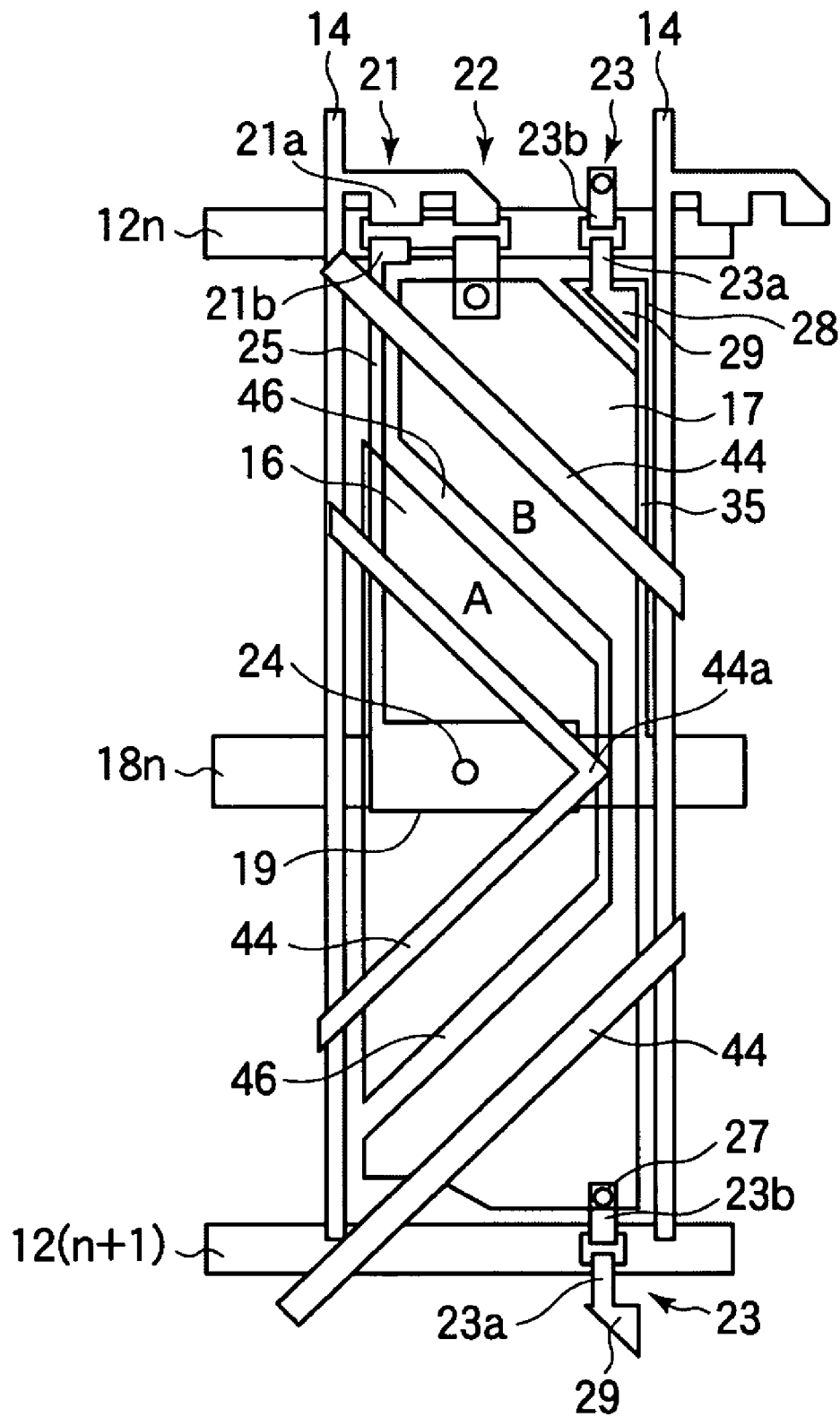
FIG. 14 shows a configuration of a liquid crystal display according to a second embodiment of the invention.
Figure 15D:
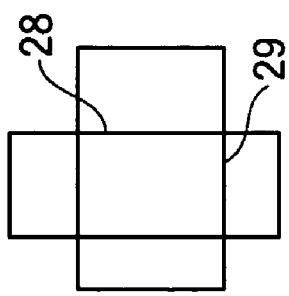
FIGS. 15A to 15D show a configuration of a buffer capacity Cb.
Figure 15C:
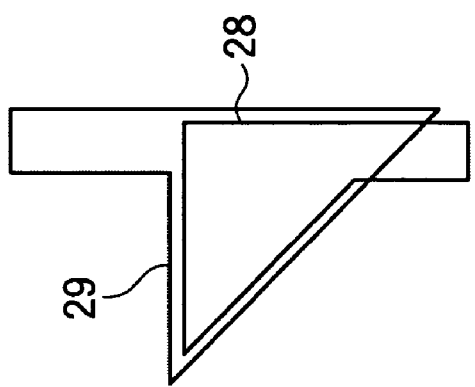
Figure 15B:
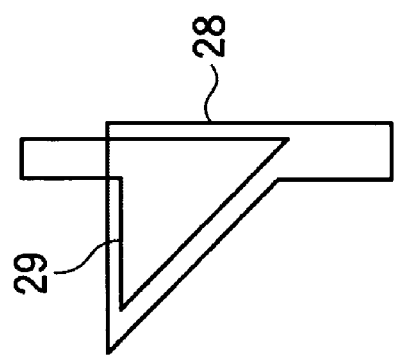

A description will now be made with reference to FIGS. 14 to 15D on a liquid crystal display according to a second embodiment of the invention. In the liquid crystal display of the first embodiment of the invention, although a relatively high light transmittance can be achieved even at a sub-pixel B, luminance may not be improved so much because of a reduction in the aperture ratio of the pixels. As shown in FIG. 9, the most significant factor reducing the aperture ratio is the TFT 23. FIG. 14 shows a configuration of the liquid crystal display of the present embodiment. As shown in FIG. 14, in the present embodiment, a TFT 23 is disposed such that it extends across a gate bus line 12(n+1) that belongs to the next pixel. As a result, the area occupied by the TFT 23 in the pixel region of interest is reduced to improve the aperture ratio of the same.

However, when the TFT 23 is disposed so as to extend across the next gate bus line 12(n+1), either drain electrode 23a or source electrode 23b is disposed in the adjacent or next pixel region. For example, let as assume that the drain electrode 23a and a buffer capacity Cb are disposed in the next pixel region and that a configuration is employed in which a connection electrode 35 for connecting a buffer capacitor electrode 28 and a storage capacitor bus line 18n will extend across the gate bus line 12(n+1) again. The configuration is not desirable because it results in a reduction in the aperture ratio. Under the circumstance, a configuration is employed in which the buffer capacitor electrode 28 is connected through the connection electrode 35 to a storage capacitor bus line 18(n+1) disposed between the gate bus line 12(n+1) and a gate bus line 12(n+2). Since storage capacitor bus lines 18 are all at the same electrical potential, no problem occurs even when a buffer capacitor electrode 28 is connected to the next storage capacitor bus line 18(n+1).

Figure 15A:
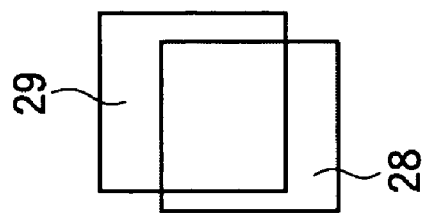

FIGS. 15A to 15D show a configuration of the buffer capacity Cb. As shown in FIG. 15A, the buffer capacity Cb is formed by overlapping the buffer capacitor electrode 28 that is in the same layer as the storage capacitor bus lines 18 with a buffer capacitor electrode 29 that is in the same layer as the drain electrode 23a while interposing an insulation layer 30 between them. As shown in FIG. 7, for example, a voltage ratio Vpx2/Vpx1 of 0.72 can be achieved by setting the capacity ratio Cc/Clc2 at about 2.5 according to the related art. On the contrary, the capacity ratio Cb/Clc2 must be smaller, i.e., about 0.2 in the present embodiment. In the present embodiment, the range of capacity ratios Cb/Clc2 that provide a desirable voltage ratio Vpx2/Vpx1 (e.g., in the range from 0.5 to 0.9) is smaller, and the voltage ratio Vpx2/Vpx1 varies more significantly in response to fluctuation of the capacity ratio Cb/Clc2. In the present embodiment, in order to suppress display irregularities of the liquid crystal display, it is therefore particularly important to keep the value of the buffer capacities Cb constant between the pixels. However, when the buffer capacitor electrodes 28 and 29 are designed with substantially the same shape and size as shown in FIG. 15A, the area of the overlap between the electrodes can fluctuate because of irregularities in the widths of the buffer capacitor electrodes 28 and 29 and positional deviations at the time of patterning of the electrodes. A problem therefore arises in that the value of the buffer capacity Cb may become uneven between the pixels to increase the possibility of display irregularities.

FIGS. 15A to 15D show examples of configurations of the buffer capacitor electrodes 28 and 29 which allow display irregularities to be suppressed. In the configuration shown in FIG. 15B, the buffer capacitor electrode 28 is designed with a width greater than that of the buffer capacitor electrode 29. As a result, fluctuation of the overlapping area is less likely to occur even when there is a relative positional deviation between the buffer capacitor electrodes 28 and 29 during formation of the same. Fluctuation of the overlapping area is also less likely to occur even when there is an irregularity in the width of the buffer capacitor electrode 28 which is designed with a greater width. In the configuration shown in FIG. 15C, the buffer capacitor electrode 29 is designed with a width greater than that of the buffer capacitor electrode 28. As a result, fluctuation of the overlapping area is less likely to occur even when there is a relative positional deviation between the buffer capacitor electrodes 28 and 29 during formation of the same. Fluctuation of the overlapping area is also less likely to occur even when there is an irregularity in the width of the buffer capacitor electrode 29 which is designed with a greater width. In the configuration shown in FIG. 15D, the buffer capacitor electrodes 28 and 29 have a band-like (rectangular) shape and are designed such that they extend across each other in their longitudinal directions. Therefore, fluctuation of the overlapping area is less likely to occur even when there is a relative positional deviation between the buffer capacitor electrodes 28 and 29 during formation of the same. Fluctuation of the overlapping area is also less likely to occur even when there are irregularities in the widths of the buffer capacitor electrodes 28 and 29 in the longitudinal direction thereof. As apparent from above, by forming the buffer capacitor electrodes 28 and 29 in the configurations shown in FIGS. 15B to 15D, a liquid crystal display having high display characteristics and no display irregularity can be provided.

Third Embodiment

A description will now be made with reference to FIGS. 16 and 17 on a liquid crystal display according to a third embodiment of the invention. A factor that reduces the yield of manufacture of liquid crystal displays according to the second embodiment as shown in FIG. 14 is shorting defect between the drain bus line 14 and the connection electrode 25. Since the drain bus line 14 and the connection electrode 25 are formed in the same layer and are extended a relatively long distance in proximity to each other, a shorting defect attributable to such as dust is likely to occur at a photolithographic process. When the connection electrode 25 and the pixel electrode 17 of the sub-pixel B are disposed in an overlapping relationship, a capacity formed between the connection electrode 25 and the pixel electrode 17 will decrease the voltage at the pixel electrode 16 of the sub-pixel A, which results in a reduction of the luminance of the pixel as a whole. When the interval between the drain bus line 14 and the connection electrode 25 is increased, an increase in the interval between the pixel electrode 16 and the drain bus line 14 is required, which results in a reduction of the aperture ratio of the pixel. It is therefore sometimes difficult to improve the yield of manufacture of liquid crystal displays as shown in FIG. 14.

Figure 16:
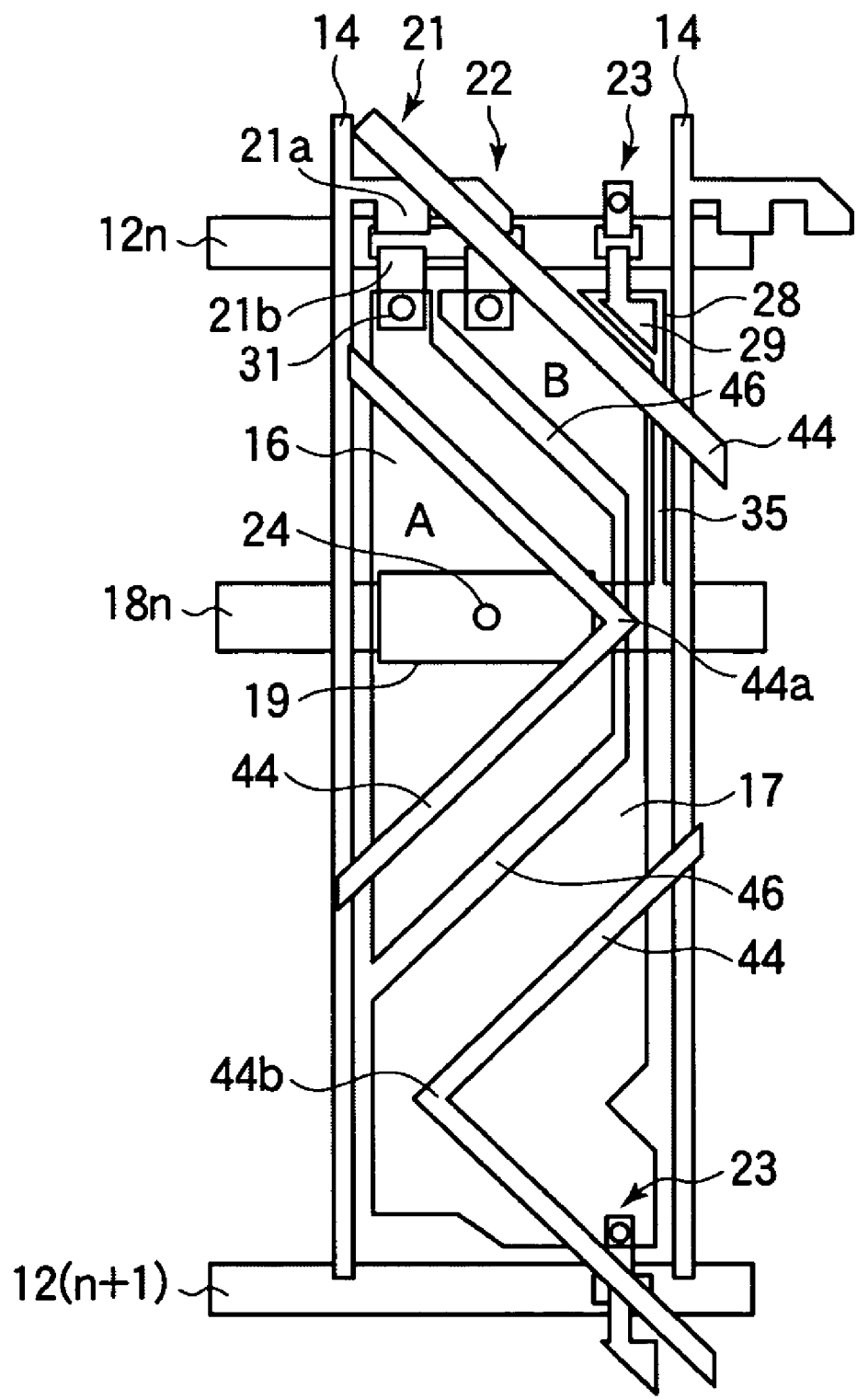
FIG. 16 shows a configuration of a liquid crystal display according to a third embodiment of the invention.

FIG. 16 shows a configuration of a pixel of a liquid crystal display according to the present embodiment. As shown in FIG. 16, a sub-pixel A of the present embodiment is disposed in a position shifted upward in the pixel region when compared with that in the liquid crystal display of the second embodiment. Both of upper edges of pixel electrodes 16 and 17 in the figure face a gate bus line 12n. The pixel electrode 16 is adjacent to a TFT 21, and the pixel electrode 17 is adjacent to a TFT 22. The pixel electrode 16 is electrically connected to a source electrode 21b of the TFT 21 through a contact hole 31. A storage capacitor electrode 19 is electrically connected to the pixel electrode 16 through a contact hole 24. Since the pixel electrode 16 is shifted upward in the pixel region, a slit 46 is also shifted upward, and linear protrusions 44 are consequently disposed upward. In the present embodiment, since there is no need for the connecting electrode 25 for electrically connecting the source electrode 21b with the storage capacitor electrode 19 and the pixel electrode 16, it is possible to suppress any reduction in the yield of manufacture of liquid crystal displays attributable to shorting defects.

In the liquid crystal display of the second embodiment shown in FIG. 14, the storage capacitor bus line 18 (along with the storage capacitor electrode 19) is disposed such that it overlaps bent parts 44a of the linear protrusions 44 that are bent substantially at right angles. The storage capacitor bus line 18 is disposed in such a region because the liquid crystal 6 has alignments in different directions which are bounded by a straight line which passes through the bent parts 44a and extends in parallel with the gate bus lies 12. Even if the storage capacitor bus line 18 is not provided, a reduction in light transmittance can occur due to disturbance in the alignment of the liquid crystal 6 in that region. By disposing the storage capacitor bus line 18 that is required for maintaining the pixel potential for one frame period in the region, it is possible to minimize a reduction in luminance attributable to the shading effect of the storage capacitor bus line 18.

In the configuration shown in FIG. 16, two bent parts 44a and 44b, which are not on the straight line in parallel with the gate bus lines 12, are disposed in one pixel because of pixel pitch. That is, there is another boundary between liquid crystal alignments which passes through the bent part 44b and which extends in parallel with the gate bus lines 12, in addition to the boundary of liquid crystal alignments which passes through the bent part 44a and which overlaps the storage capacitor bus line 18.

Figure 17:
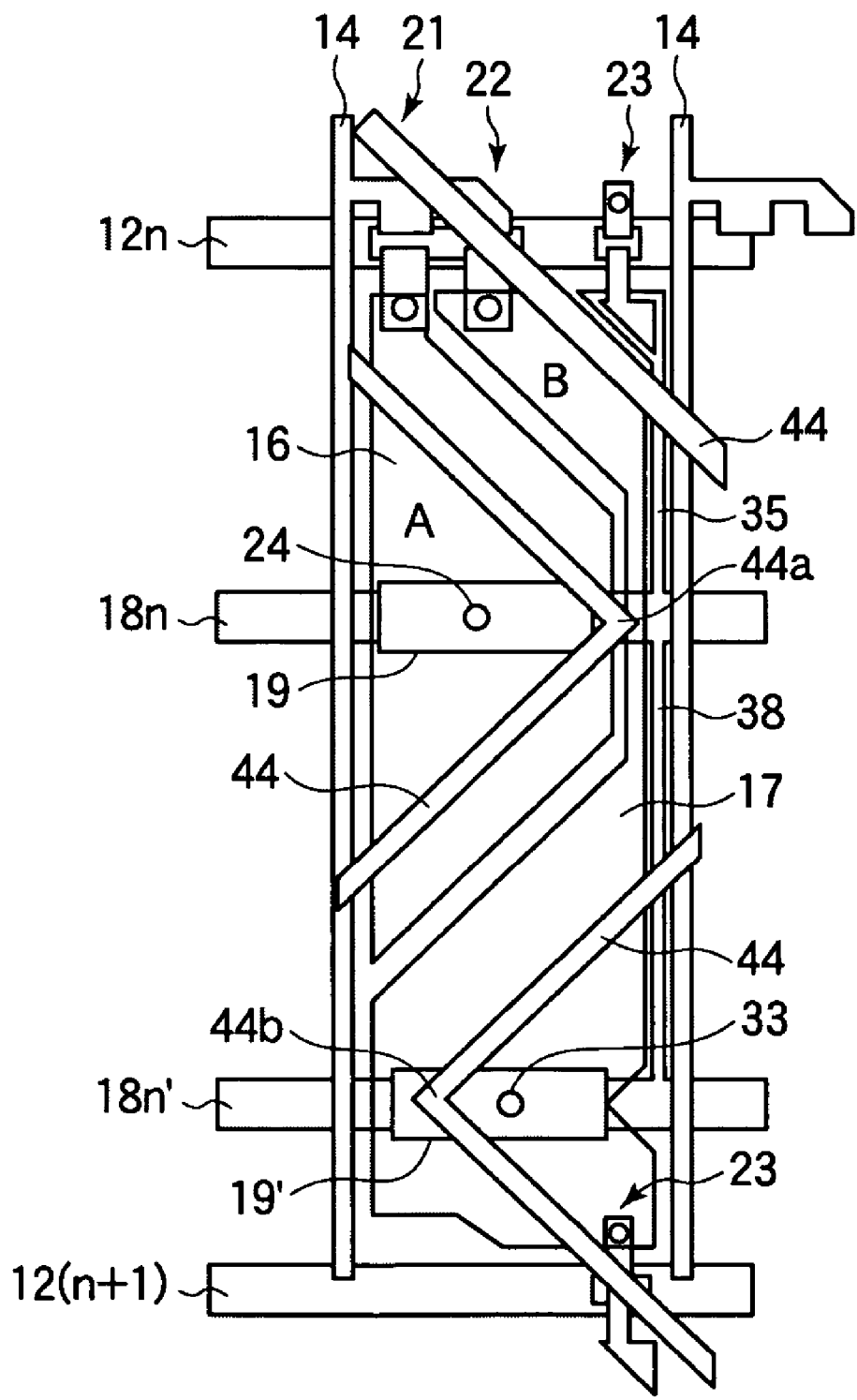
FIG. 17 shows a modification of the configuration of the liquid crystal display according to the third embodiment of the invention.

FIG. 17 shows a modification of the configuration of the liquid crystal display of the present embodiment. As shown in FIG. 17, in the present modification, a storage capacitor bus line 18n overlapping the bent part 44a and extending in parallel with the gate bus lines 12 and a storage capacitor bus line 18n' overlapping the bent part 44b and extending in parallel with the gate bus lines 12 are disposed between the gate bus line 12n and the gate bus line 12(n+1). A storage capacitor electrode 19' is formed above the storage capacitor bus line 18n' with the insulation film 30 interposed between them. The storage capacity Cs2 is formed between the storage capacitor bus line 18n' and the storage capacitor electrode 19' facing each other with the insulation film 30 interposed. The storage capacitor bus line 18n' is electrically connected to the storage capacitor bus line 18n through a connection electrode 38. The width of the storage capacitor bus lines 18n and 18n' (the storage capacitor electrodes 19 and 19') is smaller than the width of the storage capacitor bus line 18n (the storage capacitor electrode 19) in the configuration shown in FIG. 16. When a plurality of bent parts that are not on the straight line in parallel with the gate bus lines 12 are disposed in one pixel as thus described, a plurality of storage capacitor bus lines 18 are disposed such that they overlap at least two of the plurality of bent parts respectively, and the plurality of storage capacitor bus lines 18 are connected in the form of a ladder through the connection electrode 38. The present modification makes it possible to provide a liquid crystal display in which no panel failure occurs even when there is a breakage defect on the storage capacitor bus lines 18. According to the present modification, since the width of the storage capacitor bus lines 18n and 18n' and the storage capacitor electrodes 19 and 19' can be small, the substantial aperture ratio of the pixel is improved. Further, the value of the storage capacity Cs2 can be increased easily according to the present modification.

Fourth Embodiment

Figure 18:
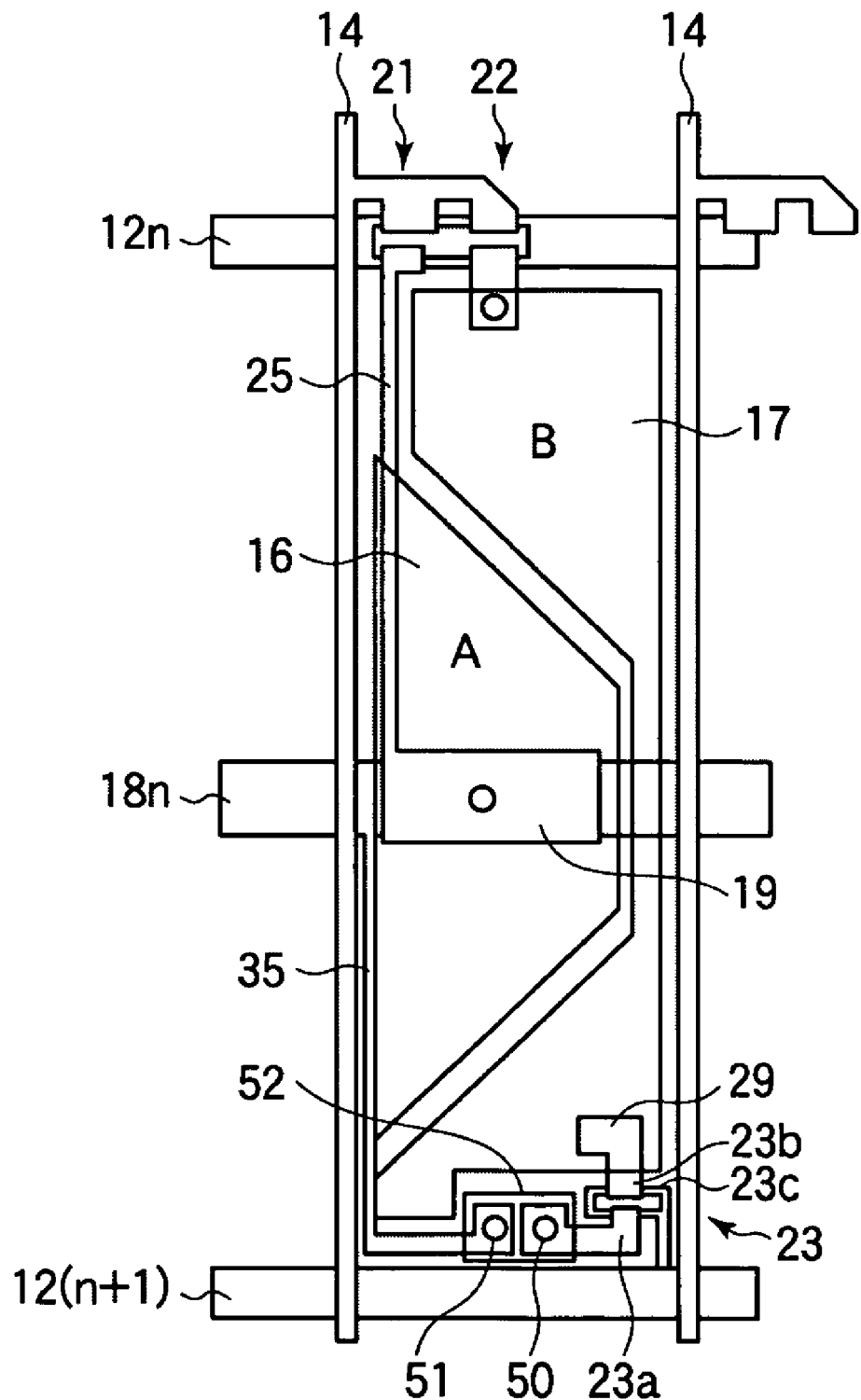
FIG. 18 shows a configuration of a liquid crystal display according to a fourth embodiment of the invention.
Figure 19:
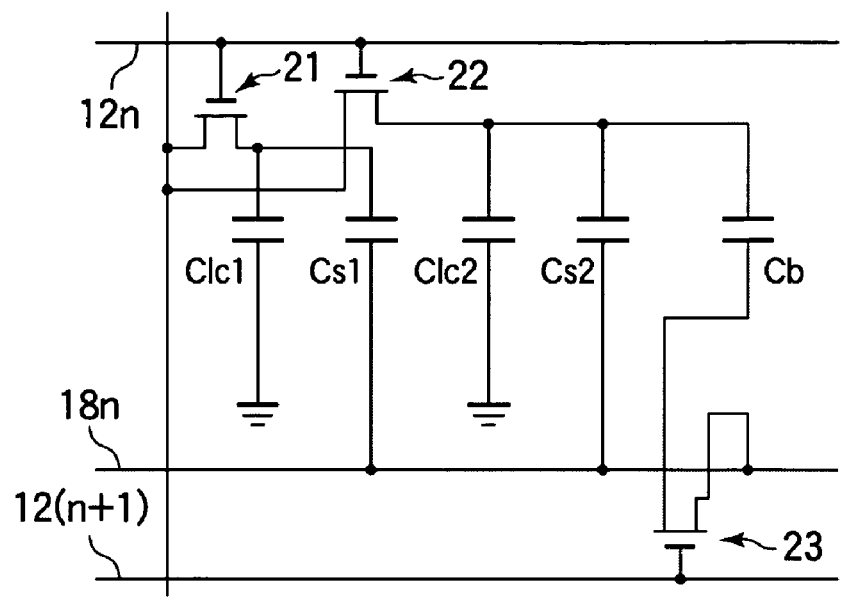
FIG. 19 shows an equivalent circuit of one pixel of the liquid crystal display according to the fourth embodiment of the invention.
Figure 20:
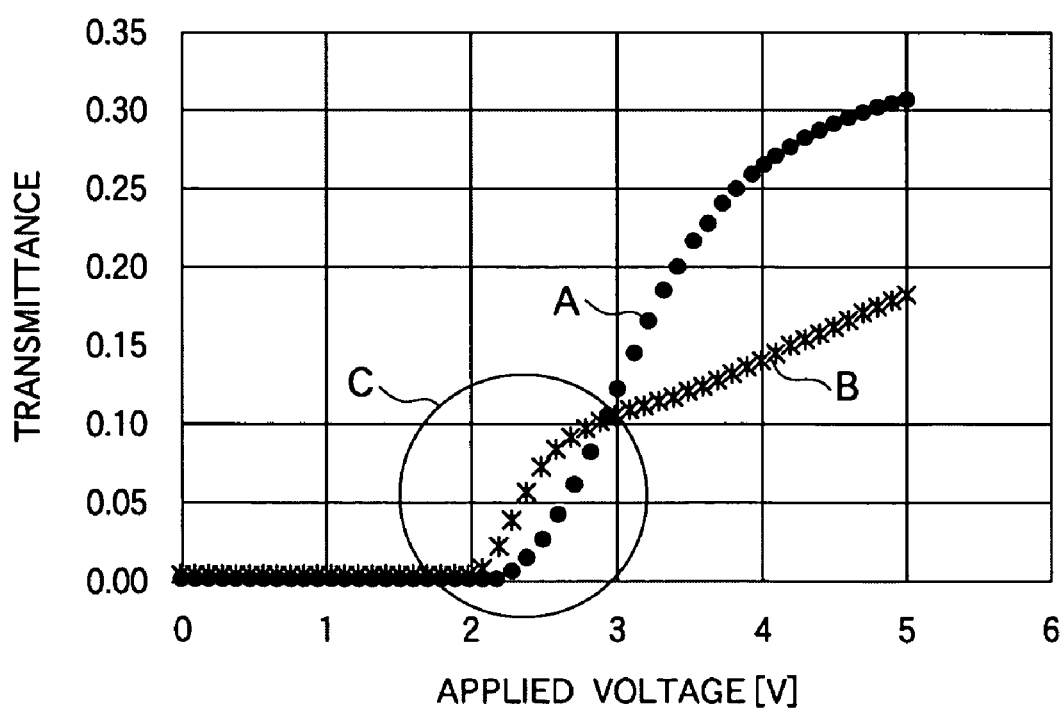
FIG. 20 is a graph showing T-V characteristics of a VA mode liquid-crystal display.
Figure 21A:
FIGS. 21A and 21B show how an image displayed on a display screen varies in its view.
Figure 21B:
Figure 22A:
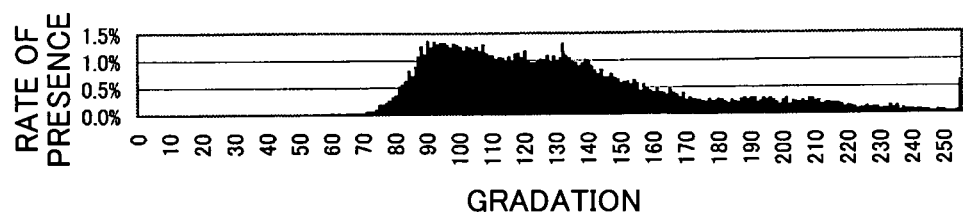
FIGS. 22A to 22C show gradation histograms of red (R), green (G), and blue (B) in a reddish image.
Figure 22B:
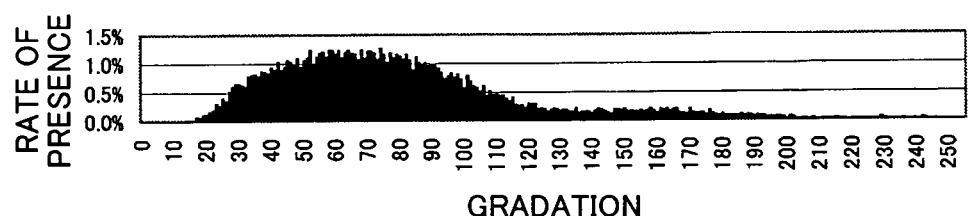
Figure 22C:
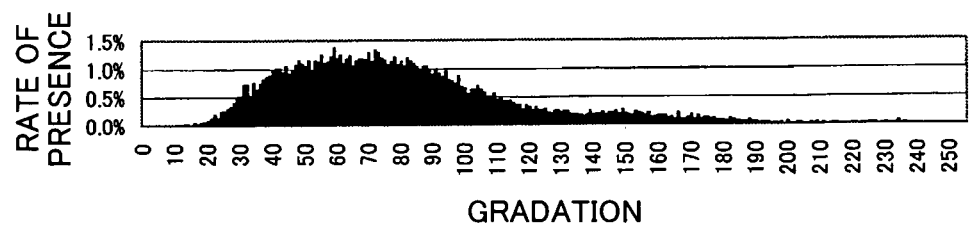
Figure 23:
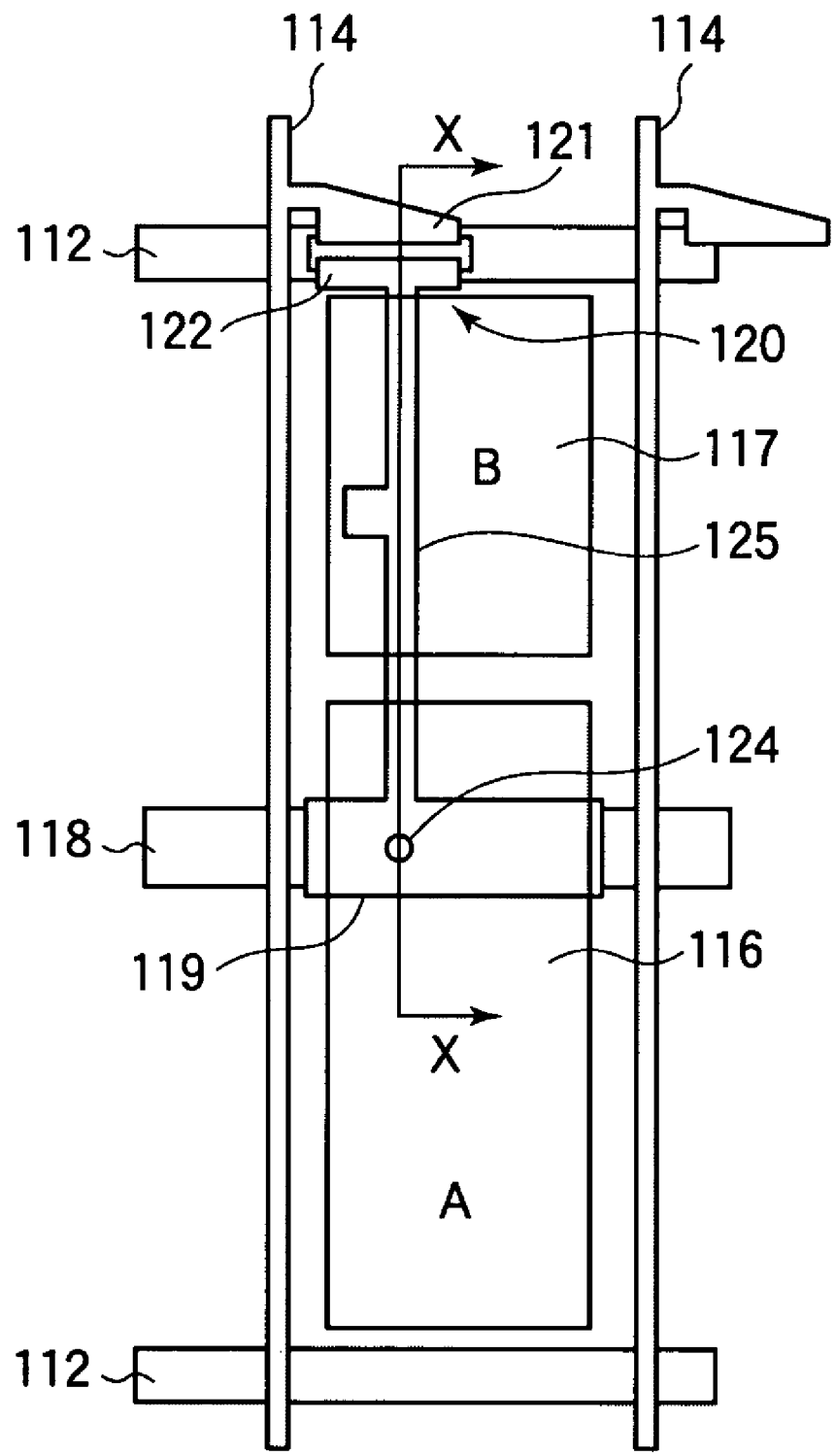
FIG. 23 shows a basic configuration of a liquid crystal display based on the known techniques.
Figure 24:
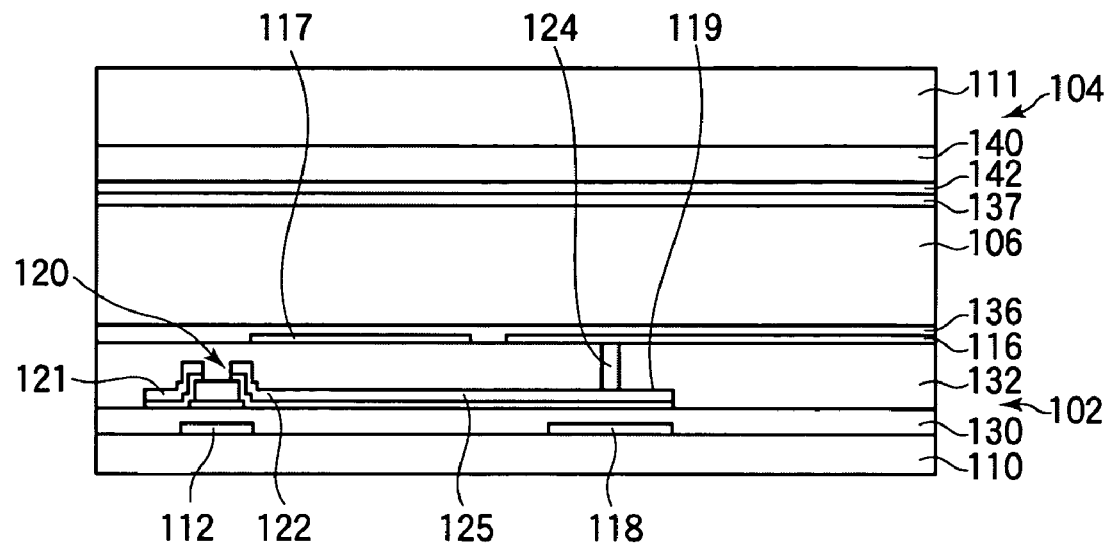
FIG. 24 is a sectional view showing the basic configuration of the liquid crystal display based on the known techniques.
Figure 25:
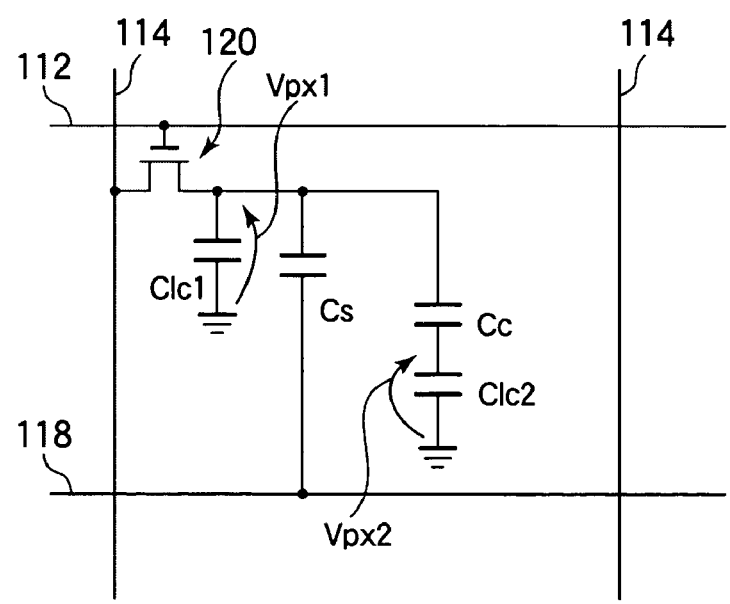
FIG. 25 shows a basic equivalent circuit of the liquid crystal display based on the known techniques.
Figure 26A:
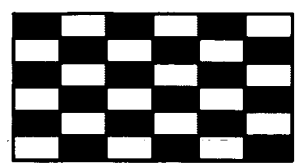
FIGS. 26A to 26D are illustrations for explaining a sticking phenomenon that occurs when the halftone method based on capacitive coupling is used.
Figure 26B:
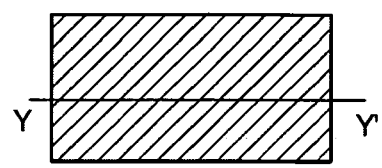
Figure 26C:
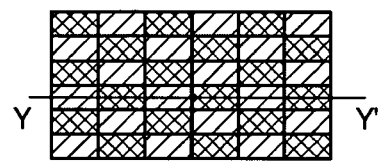
Figure 26D:
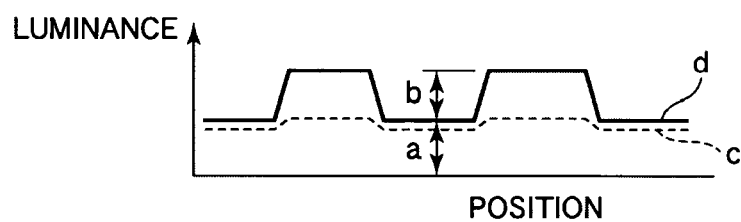
Figure 27A:
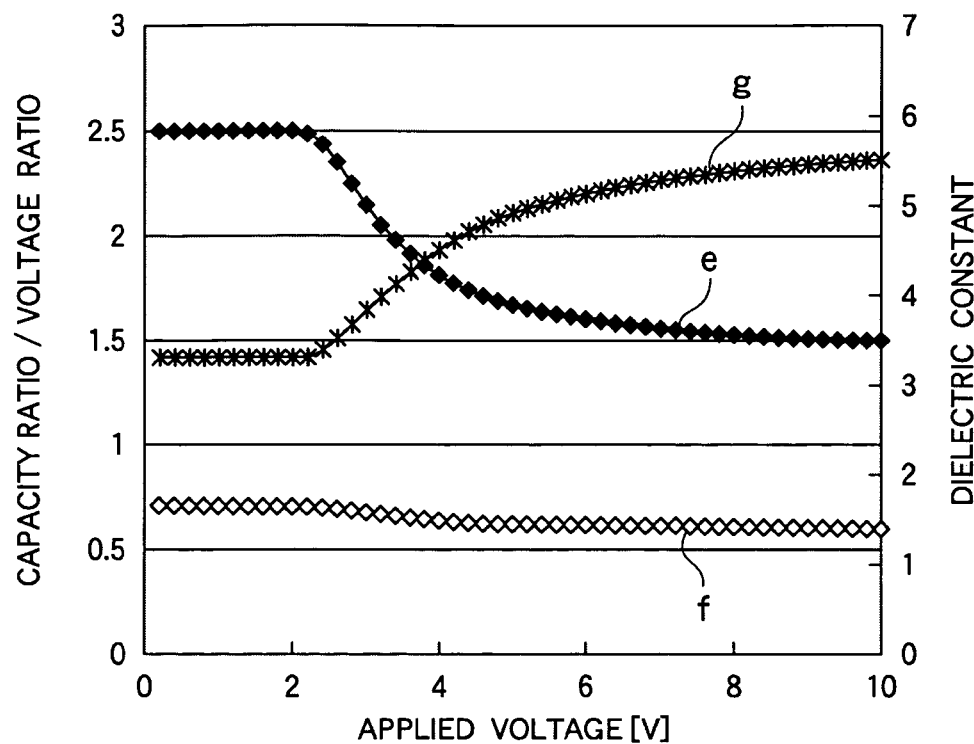
FIGS. 27A and 27B are graphs showing changes in a capacity ratio, a voltage ratio, and a dielectric constant $\in$ of the liquid crystal in a liquid crystal display employing the halftone method based on capacitive coupling.
Figure 27B:
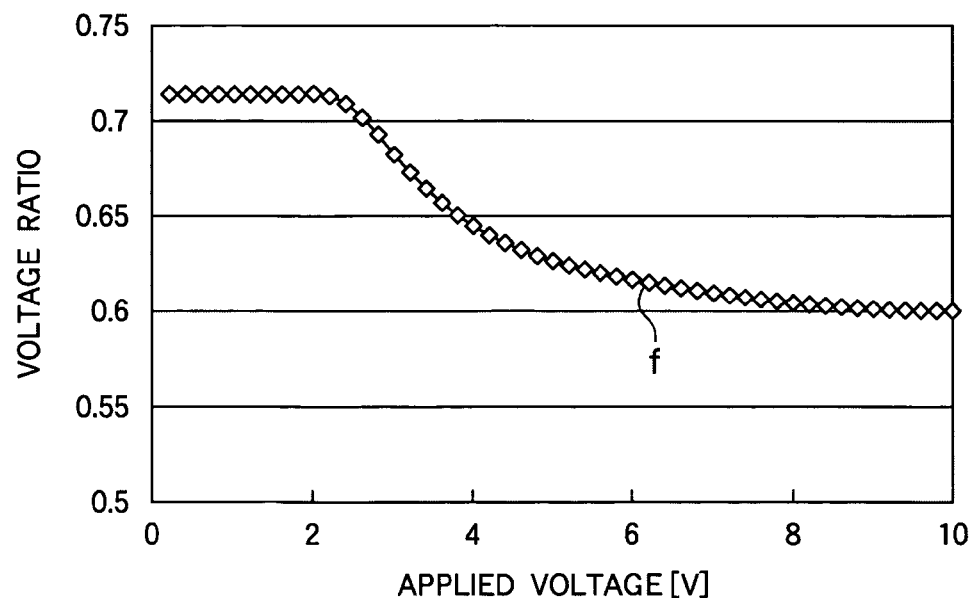

A description will now be made with reference to FIGS. 18 and 19 on a liquid crystal display according to a fourth embodiment of the invention. As shown in FIGS. 18 and 19, in the present embodiment, a source electrode 23b of a third TFT 23 is electrically connected to a buffer capacitor electrode 29. The buffer capacitor electrode 29 is disposed so as to overlap a region that is a part of a pixel electrode 17 of a sub-pixel B. In that region, the pixel electrode 17 serves as a buffer capacitor electrode, and a buffer capacity Cb is formed between the electrode and the buffer capacitor electrode 29 facing the same with a protective film 32 constituted by such as a SiN film interposed therebetween. Alternatively, a separate buffer capacitor electrode electrically connected to the pixel electrode 17 may be provided, and the buffer capacitor electrode and the buffer capacitor electrode 29 may be disposed in an overlapping relationship with an insulation film interposed between them. In this case, the buffer capacity Cb is formed between the separately provided buffer capacitor electrode and the buffer capacitor electrode 29.

A drain electrode 23a of the TFT 23 is electrically connected to a relay electrode 52 through a contact hole 50 that is an opening formed in the protective film 32. The relay electrode 52 is formed in the same layer as the pixel electrodes 16 and 17. The relay electrode 52 is electrically connected to a connection electrode 35 and a storage capacitor bus line 18n through a contact hole 51 which is an opening formed in the protective film 32 and the insulation film 30. That is, the drain electrode 23a of the TFT 23 is electrically connected to the storage capacitor bus line 18n. Just as in the configuration shown in FIG. 14, the TFT 23 may be disposed so as to extend across a gate bus line 12(n+1) belonging to the next pixel to electrically connect the drain electrode 23a to a storage capacitor bus line 18(n+1).

The present embodiment provides advantages similar to those in the first embodiment. In the present embodiment, however, since relaying must be performed using the relay electrode 52 to electrically connect the drain electrode 23a and the connection electrode 35 which are formed in layers different from each other. Therefore, there may be some reduction in the aperture ratio of the pixel.

Fifth Embodiment

Figure 28:
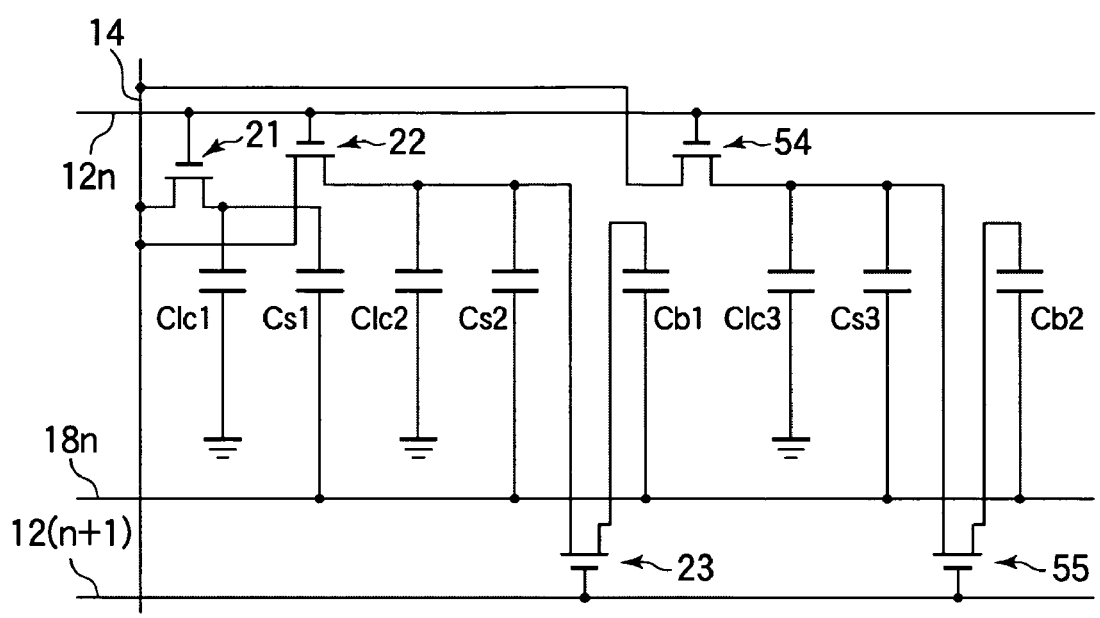
FIG. 28 shows an equivalent circuit of one pixel of a liquid crystal display according to a fifth embodiment of the invention.

A liquid crystal display according to a fifth embodiment of the invention will now be described with reference to FIG. 28. While a pixel electrode is divided into two regions A and B in the above-described embodiments by way of example, a pixel electrode may be divided into a greater number of regions A, B, C, and so on in order to achieve higher viewing angle characteristics. FIG. 28 shows an example employing three divisions in which reference symbols Clc3 and Cs3 shown in addition to those in FIG. 4 represent a pixel capacity (liquid crystal capacity) and an auxiliary capacity (storage capacity), respectively. A buffer capacity Cb2 is also provided as a structure for providing a potential difference. The sub-pixel C is connected to a drain bus line through a fourth TFT 54 and is further connected to the buffer capacity Cb2 through a fifth TFT 55.

In this case, there must be a voltage difference from sub-pixel to sub-pixel, and ratios (Cb1/Clc2+Cs2) and Cb2 (Clc3+Cs3) are different values.

The case in which a pixel is divided into 4 or more can be configured in a similar manner.

A sticking test was conducted by continuously displaying a black-and-white checker pattern for 48 hours on the display screens of the liquid crystal displays of the first to the fifth embodiments described above under a temperature condition of 50° C. As a result, it was confirmed that the liquid crystal displays of the embodiments had no sticking as encountered on liquid crystal displays according to the related art employing the capacitive coupling HT method at all. An improvement in luminance by 10% was observed in the case of the same aperture ratio as those of the liquid crystal displays according to the related art.

The invention is not limited to the above-described embodiments and may be modified in various ways.

For example, while VA mode liquid crystal displays including the MVA type have been described by way of example in the above embodiments, the invention is not limited to them and may be applied to liquid crystal displays of other types including TN mode types.

While transmissive liquid crystal displays have been described by way of example in the above embodiments, the invention is not limited by them and may be applied to other types of liquid crystal displays such as reflective and transflective types.

Further, while liquid crystal displays in which color filters are formed on an opposite substrate provided opposite to a TFT substrate have been described by way of example in the above embodiments, the invention is not limited to them and may be applied to liquid crystal displays, in which color filters are formed on a TFT substrate, having the so-called CF-on-TFT structure.

What is claimed is:
1. A substrate for a liquid crystal display, comprising:
a plurality of gate bus lines formed in parallel with each other on a substrate;
a plurality of drain bus lines formed across the plurality of gate bus lines with an insulation film interposed between them;
a plurality of storage capacitor bus lines formed in parallel with the gate bus lines;
first and second transistors each having a gate electrode electrically connected to an n-th gate bus line and a drain electrode electrically connected to one of the drain bus lines;
a first pixel electrode electrically connected to a source electrode of the first transistor;
a second pixel electrode electrically connected to a source electrode of the second transistor and separated from the first pixel electrode;
a pixel region including a first sub-pixel at which the first pixel electrode is formed and a second sub-pixel at which the second pixel electrode is formed;
a third transistor having a gate electrode electrically connected to an (n+1)-th gate bus line and a source electrode electrically connected to the second pixel electrode; and
a buffer capacitor portion including a first buffer capacitor electrode disposed in the pixel region except in a region occupied by either of the first and second sub-pixels and electrically connected to a drain electrode of the third transistor and a second buffer capacitor electrode which is disposed opposite to the first buffer capacitor elec- trode with an insulation film interposed therebetween and which is electrically connected to the storage capacitor bus line.

2. A substrate for a liquid crystal display according to claim 1, wherein the second buffer capacitor electrode is electrically connected to the storage capacitor bus line disposed between the n-th gate bus line and the (n+1)-th gate bus line.

3. A substrate for a liquid crystal display according to claim 1, wherein:
the buffer capacitor portion is disposed in a side of a next pixel region adjacent thereto across the (n+1)-th gate bus line; and
the second buffer capacitor electrode is electrically connected to the storage capacitor bus line disposed between the (n+1)-th gate bus line and an (n+2)-th gate bus line.

4. A substrate for a liquid crystal display according to claim 3, wherein the drain electrode of the third transistor is disposed in the side of the next pixel region.

5. A substrate for a liquid crystal display according to claim 1, wherein:
the first pixel electrode is disposed substantially adjacent to the first transistor; and
the second pixel electrode is disposed substantially adjacent to the second transistor.

6. A substrate for a liquid crystal display according to claim 1, wherein either of the first and second buffer capacitor electrodes is formed with a width greater than that of the other.

7. A substrate for a liquid crystal display according to claim 1, wherein both of the first and second buffer capacitor electrodes have a band-like shape and are disposed such that they extend across each other in their longitudinal directions.

8. A substrate for a liquid crystal display according to claim 1, wherein the areal ratio of the second sub-pixel to the first sub-pixel is ½ or more.

9. A substrate for a liquid crystal display according to claim 8, wherein the areal ratio is 4 or less.

10. A liquid crystal display comprising a pair of substrates provided opposite to each other and a liquid crystal sealed between the pair of substrates, wherein a substrate for a liquid crystal display according to claim 1 is used as either of the pair of substrates.

11. A liquid crystal display according to claim 10, wherein:
the other of the pair of substrates includes a common electrode; and
the ratio of the capacity of the buffer capacitor portion to the sum of a liquid crystal capacity formed between the second pixel electrode and the common electrode and a storage capacity connected in parallel with the liquid crystal capacity is 0.05 or more.

12. A liquid crystal display according to claim 11, wherein the capacity ratio is 0.6 or less.

13. A liquid crystal display according to claim 10, wherein the liquid crystal has negative dielectric constant anisotropy and is aligned substantially perpendicular to a surface of the substrates when no voltage is applied.

14. A liquid crystal display according to claim 10, further comprising a linear alignment regulating structure for regulating the alignment of the liquid crystal, wherein the alignment regulating structure includes a plurality of bent parts in one pixel region, the bent parts being out of a straight line in parallel with the gate bus lines, wherein the storage capacitor bus line is disposed so as to overlap each of at least two of the plurality of bent parts.

15. A liquid crystal display according to claim 10, comprising a linear slit portion for separating the first and second pixel electrode from each other, wherein the alignment regulating structure is disposed in parallel with the slit portion.

* * * * *

UNITED STATES PATENT AND TRADEMARK OFFICE
CERTIFICATE OF CORRECTION

PATENT NO. : 7,688,393 B2
APPLICATION NO. : 11/271527
DATED : March 30, 2010
INVENTOR(S) : Ueda et al.

It is certified that error appears in the above-identified patent and that said Letters Patent is hereby corrected as shown below:

On the Patent Face:

Under "(75) Inventors" please make the following changes:

for Kazuya Ueda, delete "Kawasaki" and insert --Mikata--;

for Hideaki Tsuda, delete "Atsugi" and insert --Ebina--.

Signed and Sealed this

Fifth Day of October, 2010

David J. Kappos
*Director of the United States Patent and Trademark Office*